US012726666B1

(12) United States Patent
Dhayala Rajan et al.

(10) Patent No.: US 12,726,666 B1
(45) Date of Patent: Sep. 1, 2026

(54) METHODS AND APPARATUS TO MONITOR ADVERTISING ON MEDIA ACCESS CLIENTS

(71) Applicant: DIRECTV, LLC

(72) Inventors: Surendiran Dhayala Rajan, Yorba Linda, CA (US); Suroor Wizarath Ali, Downey, CA (US); Sai Ramya Krishna Singuluri, El Segundo, CA (US); Mark Anthony Diaz Rocha, Whittier, CA (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

(21) Appl. No.: 19/206,987

(22) Filed: May 13, 2025

(51) Int. Cl.
*H04N 21/24* (2011.01)

(52) U.S. Cl.
CPC ............................... *H04N 21/2407* (2013.01)

(58) Field of Classification Search
CPC ................................................. H04N 21/2407
See application file for complete search history.

(56) References Cited

U.S. PATENT DOCUMENTS 8,843,626 B2 9/2014 Mazumdar et al.
8,930,980 B2 1/2015 Neumeier et al.
9,070,139 B2 6/2015 Zhang
9,519,914 B2 12/2016 Splaine et al.
9,736,516 B1 8/2017 Nguyen et al.
10,368,111 B2 7/2019 Randolph et al.
11,023,921 B2 6/2021 Wang et al.
11,451,866 B2 9/2022 Bastable et al.
2002/0042915 A1 4/2002 Kubischta et al.
2003/0220091 A1 11/2003 Farrand et al.
2008/0250453 A1 10/2008 Smith et al.
2016/0086215 A1* 3/2016 Wang ................ G06Q 30/0275 705/14.45
2019/0139075 A1* 5/2019 Cimino ............. G06F 16/90335
2019/0313135 A1* 10/2019 Pathak ............... H04N 21/8586
2020/0314494 A1* 10/2020 Loheide ............. H04N 21/2387
2021/0337254 A1* 10/2021 Lykes ................ G06Q 30/0241
2022/0124395 A1 4/2022 Schenker et al.
(Continued)

OTHER PUBLICATIONS

Brightcove, "CSAI VS SSAI: Using Client-Side or Server-Side Ad Insertion," retrieved from https://www.brightcove.com/media/csai-vs-ssai-client-side-server-side-ad-insertion/ on Mar. 11, 2025, 5 pages.

(Continued)

*Primary Examiner* — Kunal Langhnoja
(74) *Attorney, Agent, or Firm* — Hanley, Flight & Zimmerman, LLC

(57) ABSTRACT

Disclosed examples include accessing a first media asset log and a second media asset log, the intermediate client device to communicate with a plurality of media access clients and to communicate with a remote service; parsing the first media asset log based on a determination that the first media asset log corresponds to a client-side advertisement insertion type; and transmitting the second media asset log to the remote service without parsing the second media asset log at the intermediate client device based on a determination that the second media asset log corresponds to a server-side advertisement insertion type.

19 Claims, 7 Drawing Sheets

(56) References Cited

U.S. PATENT DOCUMENTS

| | | | | |
|---|---|---|---|---|
| 2023/0232056 | A1 * | 7/2023 | Wright .................. | H04H 60/64<br>725/19 |
| 2024/0022781 | A1 | 1/2024 | Danciu et al. | |
| 2025/0097500 | A1 | 3/2025 | Marshall et al. | |

OTHER PUBLICATIONS

Theo Blog, "Is Server-Guided Ad-Insertion (SGAI) revolutionizing streaming monetization," retrieved from <https://www.theoplayer.com/blog/server-guided-ad-insertion-sgai-revolutionizing-streaming-monetization> on Mar. 11, 2025, 8 pages.

IAB Tech Lab, "Video Ad Serving Template (VAST)," Version 4.2, released Jun. 2019, 111 pages.

Dolby Optiview Editorial Team, "What is SGAI (Server-Guided Ad Insertion) in streaming," Dolby OptiView, retrieved from <https://optiview.dolby.com/resources/blog/advertising/what-is-sgai-server-guided-ad-insertion-in-streaming/> on Jun. 10, 2026, 8 pages.

United States Patent and Trademark Office, "Non-Final Office Action," issued in connection with U.S. Appl. No. 19/088,770, dated May 13, 2026, 17 pages.

* cited by examiner

METHODS AND APPARATUS TO MONITOR ADVERTISING ON MEDIA ACCESS CLIENTS

FIELD OF THE DISCLOSURE

This disclosure relates generally to media distribution systems and, more particularly, to methods and apparatus to monitor advertising on media access clients.

BACKGROUND

In media distribution systems such as television broadcast systems and on-demand media services, advertisements can be delivered with content. Upon receiving a media stream, a media presentation device can present the content and the advertisements during breaks in the content. In this manner, when audience members access the content, this creates an opportunity to also present advertisements to those audience members.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
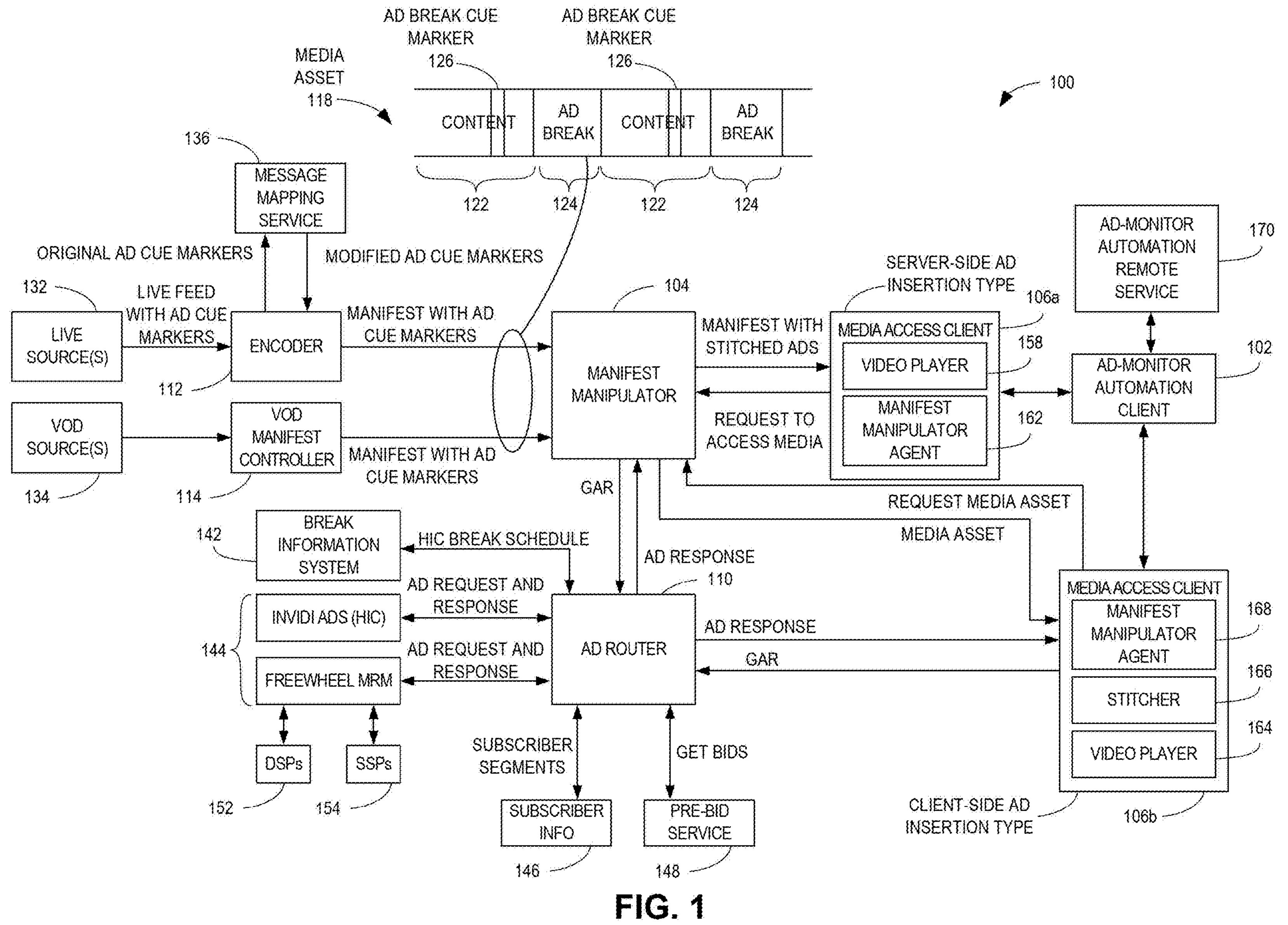
FIG. 1 is a block diagram of an example media distribution system in which an example ad-monitor automation client computer monitors dynamic advertisement insertion for advertisement breaks in media assets.

Examples disclosed herein may be used to monitor advertisement activities using an advertisement (ad)-monitor automation client. The ad-monitor automation client interacts with one or more media access clients connected to a media asset environment (e.g., a media provider network, a media provider service, etc.) to access media assets from that media asset environment. The ad-monitor automation client monitors presentations of ads in association with those media assets.

As used herein, media (e.g., a media asset) refers to video, audio, text, and/or graphics, unless noted otherwise. Media is accessible from a media provider network and/or a media provider service as live broadcast/streaming media, video-on-demand (VOD) media, and/or cloud-based digital video recording (DVR) media. In examples disclosed herein, media can be used to refer to both programming content and advertisements.

As used herein, programming content, or content, refers to primary media in a media asset such as television shows, program episodes, movies, news, music, etc. As used herein, an advertisement is secondary media in the media asset presented at different time allocations between segments of primary media in the media asset. Purchasers (e.g., manufacturers, retailers, service providers, political parties, etc.) of advertisement time pay an agreed upon price for ad spots and/or ad impressions in media assets. Such financial payments can be used by media provider networks or services to support or sponsor delivery of the programming content in the media assets.

Examples disclosed herein monitor for impressions of advertisements that are presented at media access clients in association with media assets from media provider networks or services. As used herein, an impression is the occurrence of an ad presentation via a media presentation device (e.g., a television, a mobile phone, a computer display, a tablet device, smart watches, etc.). The impression is representative of an opportunity for one or more audience members to be exposed to the presented ad.

Examples disclosed herein may be used to implement a network-based feedback tool to verify that purchasers' advertisements were presented in media assets as intended and to generate alerts/notifications about ad-selection and/or ad-presentation issues. Such verifications can also be used to correct how computing systems in a distributed media delivery system perform ad-selection and/or ad-presentation processes. In addition, such verifications can be used to reassure purchasers that their advertisements are being presented and properly placed for a target audience. An example ad-monitor automation client disclosed herein monitors presentations and placements of dynamic ad insertion (DAI) ads which are dynamically inserted in media assets at a media server or a media access client. For example, an ad-monitor automation client is connected to a media access client and controls the media access client to stream or tune to different channels or media networks that are DAI enabled. The media access client creates media asset logs of presented DAI ads and sends the media asset logs to the ad-monitor automation client for subsequent parsing based on key performance indicators (KPIs). The KPIs can be used to verify whether DAI ads are presented to audience members as intended by corresponding purchasers of ad spots. In examples disclosed herein, the ad-monitor automation client is in communication with an ad-monitor automation remote service through which a user can control the ad-monitoring activities of the ad-monitor automation client.

Examples disclosed herein improve the overall quality of advertising services for both advertisers and viewers (e.g., subscribers of media delivery services) by monitoring DAI ad presentations using advertisement KPIs corresponding to both programmers/content owners and distributors. Examples disclosed herein can be used to measure quality of service and provide automated certifications that DAI ads are being stitched into media assets and presented in manners that satisfy agreements with purchasers of ad spots. By using an ad-monitor automation client that is separate from a media access client, examples disclosed herein can be adapted and onboarded relatively quickly to monitor existing media access clients and different types of media access clients without needing to re-design such media access clients.

Examples disclosed herein may be used to test and onboard media access clients and/or DAI ad servers into a distributed media delivery system environment. For example, to test compliance of a new media access client platform, make, and/or model, examples disclosed herein may be used to run DAI ad-monitoring tests based on the media access client accessing one or more DAI-enabled live media networks, VOD media services, and/or cloud-based DVR media services. In addition, to test compliance of a new DAI ad server, examples disclosed herein may run DAI ad-monitoring tests based on the new DAI ad server providing DAI ads to one or more media access clients. In some examples, compliance of a media access client and/or a DAI ad server may be determined based on verification data, macro trend data, and/or micro trend data collected during a DAI ad-monitoring test. Based on such compliance determination, changes may be made to the media access client, the DAI ad server, and/or the distributed media delivery system to improve the DAI performance of serving media to the media access client. Accordingly, examples disclosed herein may be used to expedite DAI onboarding and improve quality of service (QoS) of DAI implementations.

FIG. 1 is a block diagram of an example media distribution system 100 in which an example ad-monitor automation client computer 102 monitors advertisements at advertisement breaks in media assets. The media distribution system 100 includes an example manifest manipulator 104 that is in communication with example media access clients 106*a,b* via a wide-area network (WAN) or a global network such as the Internet. The media distribution system also includes an example ad router 110. The ad router 110 is in communication with the manifest manipulator 104 and to the media access client 106*b* also via a WAN or a global network such as the Internet. The manifest manipulator 104 and the ad router 110 may be implemented using corresponding servers.

The media access clients 106*a,b* of the illustrated example may be different types of media access clients that operate on different client platforms such as over-the-top (OTT) devices (e.g., Roku® devices, AppleTV® devices, Amazon Fire® TV devices, service provider streaming devices, etc.), smart televisions (e.g., Roku® TVs, Samsung TVs, LG TVs, etc.), mobile phones (e.g., iOS-based iPhone® smartphones, Android® smartphones, etc.), personal computers (PCs) (e.g., laptop/PC-based device command clients, web browsers, etc.), tablet devices, game consoles (e.g., Xbox® game consoles, PlayStation® game consoles, etc.), smart watches, media apps (e.g., DirecTV® streaming app), etc. In some examples, the media access clients 106*a,b* may include one or more client applications to access media. For example, a media streaming client application may be published by a live or VOD media stream provider such as a DirecTV® Stream service, a Hulu® streaming media service, an Amazon® Prime Video® streaming service, a Netflix® video streaming service, a Disney® video streaming service, a SlingTV® live-TV streaming service, a YouTube TV® streaming service, etc. Examples disclosed herein may be used in connection with any suitable media access client application. In examples disclosed herein, different types of media access clients may be identified by corresponding media access client type identifiers which identify the platform, make, and/or model of media access clients.

In the example of FIG. 1, the media access client 106*a* uses a server-side ad insertion type of ad selection. In the server-side ad insertion type of ad selection, the manifest manipulator 104 stitches ads into media assets between content segments and provides the ad-stitched media assets to the media access client 106*a*. In some examples, a media asset from a media source may include default ads that the manifest manipulator 104 overlays with stitched in dynamically selected ads. Such dynamic selection of ads is described in greater detail below.

In the example of FIG. 1, the media access client 106*b* uses a client-side ad insertion type of ad selection. In the client-side ad insertion type of ad selection, the media access client 106*b* receives media assets from the manifest manipulator 104 without ads stitched in by the manifest manipulator 104. In some examples, a media asset provided by the manifest manipulator 104 to the media access client 106*b* may include default ads between content segments as provided by the media asset source. However, such default ads are not stitched into the media asset by the manifest manipulator 104. Instead, the default ads are incorporated into the media asset by a media source (e.g., the live source(s) 132, the VOD source(s) 134). In client-side ad insertion, the media access client 106*b* receives DAI ads from the ad router 110 and stitches the DAI ads into media assets.

Although examples disclosed herein are described in connection with server-side ad insertion and client-side ad insertion, examples disclosed herein may also be implemented using server-guided ad insertion. Server-guided ad insertion is an ad-insertion technology in which a media access client 106*b* and an ad-server (e.g., the ad servers 144) dynamically guide which ads to insert into the media asset based on real-time viewer data and context. In such examples, ad breaks (e.g., ad breaks 124) are signaled by a server (e.g., the manifest manipulator 104), ready-to-play ads are provided by the ad-server, and the media access client 106*b* handles the personalization, ad insertion, and beaconing. In examples disclosed herein, parsing of media asset logs from media access clients that use server-guided ad insertion can be handled in similar fashion to parsing of media asset logs from media access clients that use client-side ad insertion, as described below.

The media distribution system 100 also includes an example encoder 112 and an example video-on-demand (VOD) manifest controller 114. The example encoder 112 and the example VOD manifest controller 114 generate media generally represented by an example media asset 118. As used herein, a media asset refers to any identifiable unit of digital media that can be delivered, accessed, or presented via a content distribution platform. This includes, but is not limited to, live media assets (e.g., linear channels, broadcast streams, or real-time digital feeds), on-demand media assets (e.g., VOD titles, episodes, movies, or user-uploaded videos), and DVR media assets. As used herein, a live media asset is a real-time or broadcast stream (e.g., a digital channel like ESPN, live streams for specific events, etc.). As used herein, an on-demand media asset is a non-live, selectable media item (e.g., a movie, an episode, a video, etc.). As used herein, a DVR media asset, is a non-live, selectable media item that is a digital recording of a previous broadcast or live stream video. For example, the media asset 118 may be a substantially real-time feed (e.g., a near real-time feed) such that the media asset 118 is provided to the media access clients 106*a,b* in substantially real-time in response to requests from the media access clients 106*a,b*. Alternatively, the media asset 118 may be downloaded, cached, and/or played locally in a media access client 106*a,b*. For example, the media asset 118 and/or preloaded ads can be downloaded and cached in a media access client 106*a,b* at any time before the media asset 118 and/or preloaded ads is/are decoded and presented by the media access client 106*a,b*. Alternatively, the media asset 118 and/or preloaded ads can be played locally from removable media (e.g., a memory card, a removable flash drive, etc.). The media asset 118 includes example content segments 122 and example ad break segments 124. The content segments 122 include programming content such as television shows, program episodes, movies, news, music, etc. The ad break segments 124 are provided to present ads via the media access clients 106*a,b*. The media asset 118 also includes example ad break cue markers 126 co-located with the content segments 122 in a manner that the ad break cue markers 126 are not perceivable by an audience of the media asset 118. Each ad break cue marker 126 uniquely identifies a corresponding one of the ad breaks 124 that is upcoming in the media asset 118.

The encoder 112 is in communication with one or more example live source(s) 132. The live source(s) 132 provide media streams of scheduled programming offered by one or more live digital television media providers and/or media stream providers (e.g., CNN, FOX, WFLD, ESPN, ABC, NBC, CBS, etc.). As used herein, scheduled programming refers to media that is scheduled in advance and streamed on a live media stream according to scheduled days and times.

The VOD manifest controller 114 is in communication with one or more VOD source(s) 134. The VOD source(s) 134 store media files that can be served to the media access clients 106*a,b* in response to requests from the media access clients 106*a,b* to stream particular media files per audience member request. For example, a media access client 106*a,b* may receive a request from a corresponding audience member to access a particular on-demand media asset (e.g., a movie, a particular television show episode, a particular music video, etc.). The media access client 106*a,b* forwards the request to the VOD manifest controller 114. The VOD manifest controller 114 requests the identified on-demand media asset from a VOD source 134. In response, the VOD source 134 serves the requested on-demand media asset in substantially real-time for receipt (e.g., as the media asset 118) by the requesting media access client 106*a,b*.

In examples disclosed herein, media assets are accessed from the live source(s) 132 and/or the VOD source(s) 134 based on media asset identifiers. In examples disclosed herein, a media asset identifier refers to any identifier associated with a media asset such as a media network name, a television network identifier, a media title, or any other designation used to locate or reference the media asset. For example, a media network identifier identifies a live media stream provider (e.g., one of the live source(s) 132) that provides access to its media stream via an app, a webpage, or a channel lineup of a multi-provider service; a television network identifier identifies a live digital television media provider (e.g., one of the live source(s) 132); and a media asset identifier is a media title of an on-demand media asset or a DVR media asset that can be accessed from the VOD source(s) 134 or from a cloud-based DVR service.

The media distribution system 100 also includes an example message mapping service 136. The message mapping service 136 translates original ad cue markers in live media streams from the live source(s) 132 to modified ad cue markers that are readable by the manifest manipulator 104 to perform dynamic ad insertion (DAI) by requesting ads from ad servers and stitching the ads into the live media streams at locations identified by the ad cue markers for different types of ad inventories. For example, some media networks may choose to monetize ad space for programmer/content owner inventory, other media networks may choose to monetize ads for distributor inventory, and yet other media networks may choose to monetize ad space for both programmer/content owner inventory and distributor inventory. For example, a live source 132 provides a live feed with ad cue markers to the encoder 112. In examples disclosed herein, the ad cue markers are represented by the ad break cue markers 126 in the media asset 118 and identify or cue corresponding upcoming ad breaks 124. The ad cue markers in the live feed from the live source 132 may be implemented using a SCTE-35 standard defined by the Society of Cable Telecommunications Engineers (SCTE) or any other suitable standard.

In the example of FIG. 1, the encoder 112 forwards original ad cue markers from the live feed to the message mapping service 136. The message mapping service 136 modifies the original ad cue markers to generate modified ad cue markers that are readable by the manifest manipulator 104 to insert ads in the ad breaks 124 based on the modified ad cue markers. In the illustrated example, the encoder 112 sends a manifest with modified ad cue markers to the manifest manipulator 104. In examples disclosed herein, a manifest includes the media asset 118 (e.g., the live feed) and a playlist of media segments (e.g., a listing of content identifiers and add cue markers (e.g., ad break cue markers 126)) describing the media segments in the media asset 118 (e.g., for a corresponding streaming media channel) to be played by a receiving media access client. In examples disclosed herein, a manifest corresponds to a particular television channel/stream or media network being accessed. For server-side ad insertion, a manifest also includes dynamically selected ads stitched in by the manifest manipulator 104.

The VOD manifest controller 114 receives VOD feeds with ad cue markers from the VOD source(s) 134. In the illustrated example, the ad cue markers from the VOD sources 134 are already readable by the manifest manipulator 104. Therefore, the VOD manifest controller 114 does not need to send the ad cue markers from the VOD feeds to the message mapping service 136 for modification. The ad cue markers in the VOD feeds are represented as the ad break cue markers 126 of corresponding upcoming ad breaks 124 in the media asset 118. In the illustrated example, the VOD manifest controller 114 sends a manifest with ad cue markers to the manifest manipulator 104. The manifest includes the media asset 118 (e.g., the VOD feed) and a listing of content identifiers and add cue markers (e.g., ad break cue markers 126) describing the media segments in the media asset 118.

The manifest manipulator 104 analyzes the media asset 118 for ad break cue markers 126 corresponding to upcoming ad breaks 124. When an ad break cue marker 126 is encountered, the manifest manipulator 104 sends a generic ad request (GAR) to the ad router 110. The manifest manipulator 104 identifies the ad break cue marker 126 in the GAR. The GAR causes the ad router 110 to generate an ad response that informs the manifest manipulator 104 how to handle the upcoming ad break 124. For example, the media asset 118 may include default ads in the ad breaks 124. In examples disclosed herein, such default ads are referred to as burnt-in advertisements. A burnt-in ad is regionally relevant based on an audience's geographic region. For some ad breaks 124, the ad router 110 provides dynamically selected advertisements to be inserted into those ad breaks 124 using DAI. In examples disclosed herein, such dynamically selected advertisements are referred to as DAI advertisements. A DAI ad is user-level and/or household-level relevant to an audience member and may be selected based on user-level and/or household-level demographics, interests, behaviors, etc. As such, the ad router 110 may inform the manifest manipulator 104 and an ad response that an upcoming ad break 124 should proceed with a default burnt-in ad or that a dynamically selected DAI ad should be presented in place of the default burnt-in ad during the ad break 124. If the ad response indicates that a dynamically selected DAI ad should be presented, the ad response also includes the DAI ad so that the manifest manipulator 104 can stitch the DAI ad into the media asset 118 at the ad break 124. This is referred to as a server-side ad insertion type of ad delivery.

The ad router 110 is in communication with an example break information system 142, example ad servers 144, an example subscriber information database 146, and an example pre-bid service 148. The break information system 142 includes ad schedule information corresponding to ad break cue markers 126 (e.g., ad cue markers). The ad schedule information in the break information system 142 includes schedule information corresponding to different ad breaks 124 that specifies which ad server 144 to route the request to.

When an ad break cue marker 126 is detected by the manifest manipulator 104 in the media asset 118, the manifest manipulator 104 sends a GAR to the ad router 110. In turn, the ad router 110 sends a request to the break information system 142. The break information system 142 locates the ad break cue marker 126 in the schedule information and determines which ad server 144 (e.g., an INVIDI® ad server or a Freewheel® MRM ad server) to route the break to for the upcoming ad break 124 corresponding to the ad break cue marker 126.

If the break information system 142 determines the request needs to be routed the Freewheel® MRM ad server in the ad servers 144, the ad router 110 obtains bids from the pre-bid service 148. For example, the Freewheel® MRM ad server in the ad servers 144 may submit pre-bids into the pre-bid service 148 to bid on upcoming ad breaks 124. In some examples, the pre-bids are conditioned on audience demographics, interests, behaviors, times of day, media networks, and/or any other suitable criteria. As such, to analyze the bids from the pre-bid service 148, the ad router 110 obtains subscriber segment information from the subscriber information database 146. To select relevant subscriber segment information, the ad router 110 obtains a media access client ID from the GAR request. As used herein, the media access client ID refers to an identifier of the media access client 106*a,b* that has made the request to access the media asset 118. In the example of FIG. 1, the subscriber information database 146 stores the media access client ID in association with corresponding subscriber segment information. As such, the subscriber segment information is representative of demographics, interests, behaviors, etc. of the audience member(s) corresponding to that particular media access client 106*a,b*.

When the ad router 110 finds one or more bids that match the subscriber segment information corresponding to the media access client 106*a,b* that will receive the upcoming ad break 124, the ad router 110 makes a request to the Freewheel® MRM ad server in the ad servers 144. The Freewheel® MRM ad server then determines the bid with highest monetary value and returns the corresponding ad in the response for the upcoming break 124. In some examples, the ad request includes the subscriber segment information from the subscriber information database 146 so that the ad server 144 can use the subscriber segment information to select a relevant DAI ad. In the example of FIG. 1, the ad servers 144 include an INVIDI® ads hard interconnect (HIC) server from INVIDI Technologies Corporation of Princeton, New Jersey, United States of America, and the Freewheel® technology platform (e.g., a FreeWheel Media Rights Management (MRM) server) of New York, New York, United States of America. However, any other ad providers may be used as the ad servers 144.

In some examples, one or more ad servers 144 may be in communication with one or more demand-side platforms (DSPs) 152 and/or one or more supply-side platforms (SSPs) 154. The DSPs 152 and SSPs 154 facilitate target ad selection by targeting audiences based on demographics, interests, behaviors, and/or other audience-specific characteristics.

The media access client 106*a* includes an example video player 158 and an example manifest manipulator agent 162. The video player 158 decodes and presents the media asset 118 via a corresponding media presentation device connected to the media access client 106*a*. The manifest manipulator agent 162 is provided to enable communications between the media access client 106*a* and manifest manipulator 104. For example, the manifest manipulator agent 162 may be implemented as a software program developed using tools, libraries, and application programming interfaces (APIs) from a manifest manipulator software development kit (SDK). In the example of FIG. 1, the manifest manipulator agent 162 sends requests to stream media to the manifest manipulator 104 and receives manifests with stitched advertisements from the manifest manipulator 104. In some examples, the requests to stream media generated by the manifest manipulator agent 162 are requests to stream particular television network channels (e.g., DAI-enabled channels). In such examples, the manifest manipulator agent 162 populates the request with a television network identifier corresponding to a television channel selected by an audience member via the media access client 106*a*. The manifest manipulator 104 uses the television network identifier to request a corresponding media stream from the encoder 112. As noted above, the media access client 106*a* uses server-side ad insertion. As such, the media assets 118 received by the media access client 106*a* from the manifest manipulator 104 may include one or more ads stitched in by the manifest manipulator 104.

The media access client 106*b* includes an example video player 164, an example stitcher 166, and an example manifest manipulator agent 168. The video player 164 decodes and presents the media asset 118 via a corresponding media presentation device connected to the media access client 106*b*. The manifest manipulator agent 168 is provided to enable communications between the media access client 106*b* and the manifest manipulator 104. For example, the manifest manipulator agent 168 may be implemented as a software program developed using tools, libraries, and APIs from a manifest manipulator SDK. In the example of FIG. 1, the manifest manipulator agent 168 sends requests to stream media to the manifest manipulator 104 and receives media assets 118 without stitched-in ads from the manifest manipulator 104. As described above, the media assets 118 may include default ads (e.g., burnt-in ads) provided by corresponding media sources (e.g., the live source(s) 132 and/or the VOD source(s) 134). However, such default ads are not stitched in by the manifest manipulator 104.

In some examples, the media access client 106*b* is in communication directly with the encoder 112 and the VOD manifest controller 114 without being in communication with the manifest manipulator 104. In such examples, the manifest manipulator agent 168 requests media directly from the encoder 112 and/or the VOD manifest controller 114 and receives requested media directly from the encoder 112 and/or the VOD manifest controller 114 without communicating through the manifest manipulator 104.

As noted above, the media access client 106*b* uses client-side ad insertion to stitch in dynamically selected ads at the media access client 106*b*. For example, the manifest manipulator agent 168 may analyze the media asset 118 from the manifest manipulator 104 to detect ad break cue marker 126 corresponding to upcoming ad breaks 124. Upon the detection of an ad break cue marker 126, the manifest manipulator agent 168 sends a GAR to the ad router 110 to request a dynamically selected ad for the upcoming ad break 124. In response, the ad router 110 processes the GAR in a substantially similar manner as described above for the GAR from the manifest manipulator 104. The ad router 110 obtains a dynamically selected ad from one of the ad servers 144 and sends an ad response including the selected ad to the media access client 106*b*. After the media access client 106*b* receives the ad response, the stitcher 166 stitches the dynamically selected ad from the ad response into the media asset 118 at the corresponding ad break 124. The video player 164 then decodes the stitched in dynamically selected ad during the ad break 124 and presents the dynamically selected ad via a presentation device.

To monitor ads presented by the media access clients 106*a,b*, the ad-monitor automation client 102 is in communication with the media access clients 106*a,b* and an example ad-monitor automation remote service 170 via one or more networks (e.g., a WAN, one or more local area networks (LANs), etc.). As such, in examples disclosed herein, the ad-monitor automation client 102 is an intermediate client device in communication between the media access clients 106*a,b* and the ad-monitor automation remote service 170. The ad-monitor automation remote service 170 may be implemented using a server in a data center that has a client-server relationship with the ad-monitor automation client 102. Alternatively, the ad-monitor automation remote service 170 may be implemented as a cloud-based service that may be implemented in one or more servers in one or more data centers and that includes an API through which communications are exchanged with the ad-monitor automation client 102. The ad-monitor automation remote service 170 receives requests from users to perform ad monitoring. In turn, the ad-monitor automation remote service 170 forwards such requests to the ad-monitor automation client 102 so that the ad-monitor automation client 102 can communicate with the media access clients 106*a,b* to perform such ad monitoring and return ad monitoring results to the ad-monitor automation remote service 170. The ad-monitor automation client 102 and the ad-monitor automation remote service 170 are described in more detail below in connection with FIG. 2.

Figure 2:
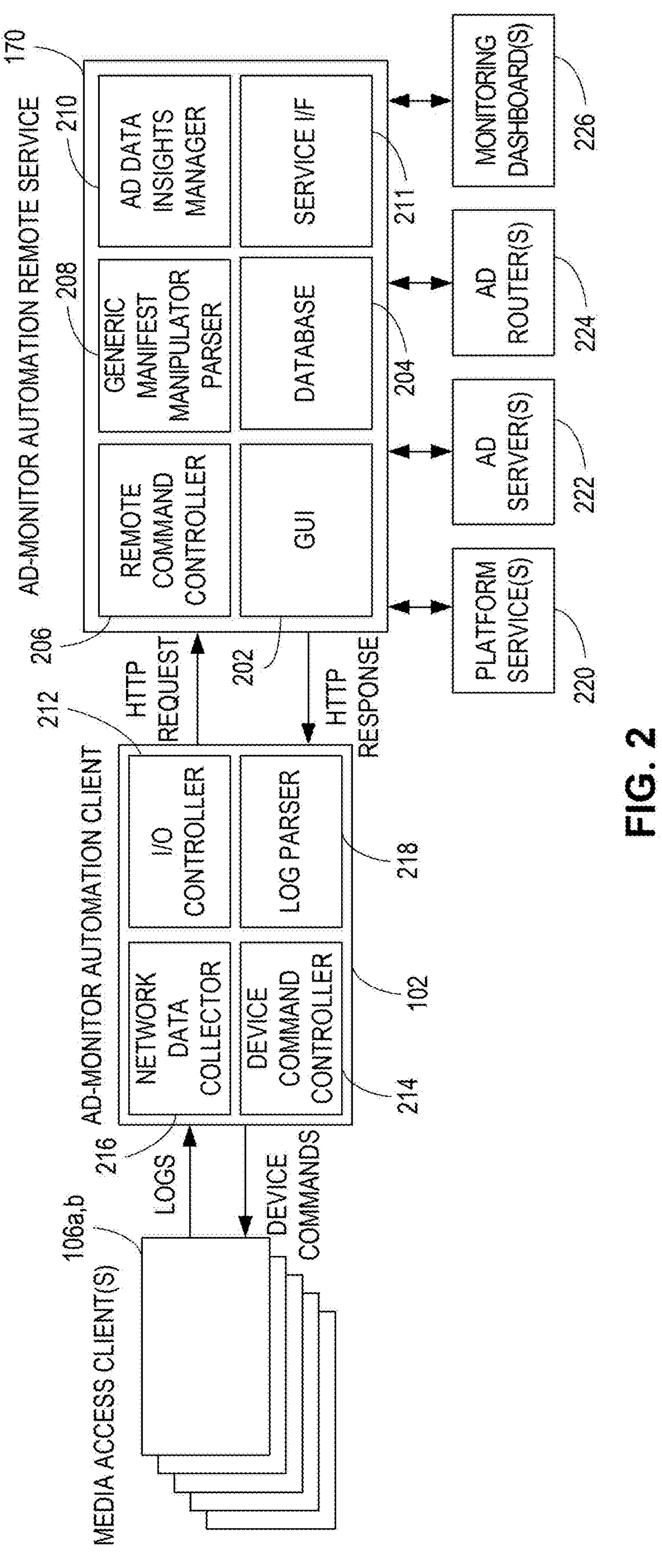
FIG. 2 shows the example ad-monitor automation client of FIG. 1 in communication with the media access clients and the ad-monitor automation remote service of FIG. 1.

FIG. 2 shows the ad-monitor automation client 102 in communication with the media access clients 106*a,b* and the ad-monitor automation remote service 170 of FIG. 1. The ad-monitor automation client 102 may be connected to the media access clients 106*a,b* of FIG. 1 and/or to any other number of media access clients. In the example of FIG. 2, the ad-monitor automation remote service 170 includes an example graphical user interface (GUI) 202, an example database 204, an example remote command controller 206, an example generic manifest manipulator parser 208, an example ad data insights manager 210, and an example service interface (I/F) 211. The example ad-monitor automation client 102 includes an example input/output (I/O) controller 212, an example device command controller 214, an example network data collector 216, and an example log parser 218.

The ad-monitor automation client 102 and the ad-monitor automation remote service 170 are provided to parse media asset logs generated and received from the media access clients 106*a,b*, as described below. The ad-monitor automation client 102 and the ad-monitor automation remote service 170 are also provided to generate ad analytics information related to DAI advertisements and make such analytics information available for access by users to view. The processes described below in connection with the ad-monitor automation client 102 and the ad-monitor automation remote service 170 can be applied similarly for media assets and ads associated with the live source(s) 132, the VOD source(s) 134, and/or cloud-based DVR media sources. As such, any process described in association with media or media networks of the live source(s) 132 may be similarly applied to media or media networks of the VOD source(s) 134 and/or media from cloud-based DVR media sources. Similarly, any process described in association with media or media networks of the VOD source(s) 134 may be similarly applied to media or media networks of the live source(s) 132 and/or media from cloud-based DVR media sources.

Turning to the ad-monitor automation remote service 170, the GUI 202 provides user input fields and user controls to allow users to schedule DAI ad-monitoring tests. For example, a user can use the GUI 202 to schedule a DAI ad-monitoring test and enter ad-monitoring configuration information for different ad-monitoring parameters for that ad-monitoring test. The ad-monitoring parameters are used to control the media access clients 106*a,b* to generate logged advertisement information (e.g., media asset logs). For example, the media access clients 106*a,b* monitor advertisement activity at the media access clients 106*a,b* based on the ad-monitoring parameters, generate advertisement information about the ad monitoring, and store the advertisement information in media asset logs. Example ad-monitoring parameters include television channel ID, on-demand media asset identifier, monitoring schedule (e.g., monitoring date, monitoring start time, monitoring end time, etc.), log collection time intervals (e.g., intervals for the ad-monitor automation client 102 to send media asset logs from the media access clients 106*a,b* to the ad-monitor automation remote service 170), and/or any other suitable type of ad-monitoring parameters. In some examples, the ad-monitor automation remote service 170 implements user-level access control, including authentication, authorization, and auditing, using the GUI 202 to prevent unauthorized access and increase brand safety of advertisers.

In examples disclosed herein, a media network identifier refers to a call sign or channel name of a television broadcast station such as CNN, FOX, WFLD, ESPN, ABC, NBC, CBS, WGN (e.g., WGN-TV), etc. Live broadcast media streams from the live source(s) 132 can be associated with television broadcast stations that are assigned television channel numbers. The media network identifier differs from a channel number in that a television broadcast station identified by a corresponding media network identifier may stream or be broadcast on different channel numbers in different markets. As such, a media network identifier for live broadcast media may stream on one channel number (e.g., channel 5) in a first market and a different channel number (e.g., channel 7) in a second market.

The database 204 is provided to store scheduled ad-monitoring tests and media asset logs collected from media access clients 106*a,b*. The remote command controller 206 is provided to generate remote-originated commands (e.g., DAI ad-monitoring test request commands) that include ad-monitoring configuration information based on the scheduled ad-monitoring tests in the database 204 and the ad-monitoring parameters provided by users via the GUI 202. The remote command controller 206 sends the remote-originated commands to the ad-monitor automation client 102 (e.g., via Hypertext Transfer Protocol (HTTP) responses). The remote command controller 206 also receives communications from the ad-monitor automation client 102.

The generic manifest manipulator parser 208 is provided to parse media asset logs associated with server-side ad insertion from the media access client 106*a*. In examples disclosed herein, media asset logs corresponding to client-side ad insertion are parsed by the ad-monitor automation client 102. However, media asset logs corresponding to server-side ad insertion are not parsed by the ad-monitor automation client 102. Instead, the ad-monitor automation client 102 distinguishes media asset logs corresponding to server-side ad insertion from media asset logs corresponding to client-side ad insertion, and forwards media asset logs corresponding to server-side ad insertion to the ad-monitor automation remote service 170 without parsing those media asset logs at the ad-monitor automation client 102.

The ad data insights manager 210 is provided to analyze parsed media asset log information from the ad-monitor automation client 102 and/or from the generic manifest manipulator parser 208. For example, the ad data insights manager 210 can glean different advertisement insights about ad breaks 124 and/or ads presented during the ad breaks 124 to generate trend data based on such insights. Examples of such advertisement insights and trend data can be based on any verification data, micro trend data, and/or macro trend data described herein. Example macro trend data and micro trend data includes ad impressions-to-bid ratios, ad starts, ad requests, impressions fired, and technical fill rate.

In the example of FIG. 2, the ad-monitor automation remote service 170 is in communication with one or more example platform service(s) 220, one or more example ad server(s) 222, one or more example ad router(s) 224, and one or more example monitoring dashboards 226. The example platform service(s) 220 correspond to media platforms that perform server-side ad stitching and provide media assets 118 to media access clients such as the media access client 106*a*. The ad-monitor automation remote service 170 communicates with the platform service(s) 220 to determine how the server-side ad stitching is performed so that the generic manifest manipulator parser 208 can parse media asset logs from the media access client 106*a* associated with server-side ad stitching. The ad server(s) 222 represent the ad servers 144 of FIG. 1. The ad data insights manager 210 communicates with the ad server(s) 222 to validate parameters of ad requests and gather data about the DAI ads available for DAI.

The ad router(s) 224 represent the ad router 110 of FIG. 1 and other ad routers. The ad data insights manager 210 communicates with the ad router(s) 224 to verify ad IDs obtained from parsed media asset logs with ad IDs of ads provided by the ad router(s) 224. For example, the ad data insights manager 210 determines whether an ad ID provided by an ad router 224 is present in a parsed media asset log. If an ad ID from a parsed media asset log is not verifiable (e.g., not present in the parsed media asset log) based on ad IDs of ads provided by the ad router(s) 224, the ad data insights manager 210 determines that there has been a network issue, an ad request parameter failure, and/or an impression verification failure for the corresponding ad ID in the parsed media asset log. The monitoring dashboards 226 are provided to analyze and/or display analytical advertisement insights information generated by the ad data insights manager 210 about its ad-monitoring analyses on parsed media asset logs. Users may use the monitoring dashboards 226 to review such analytical advertisement insights information. In examples disclosed herein, the ad server(s) 222 and the monitoring dashboard(s) 226 may provide macro trends to the ad data insights manager 210.

The service I/F 211 is configured to transmit alerts or notifications to users who are subscribed to receive event-related updates. Notifications can be delivered through various communication channels, including but not limited to internet-based services, mobile communication networks, or other digital delivery mechanisms. These notifications may include information such as verification outcomes, advertising event summaries, and/or trend insights derived from one or more components, including the generic manifest manipulator parser 208, the log parser 218, and/or the ad data insights manager 210. In some examples, the service I/F 211 is also configured to support additional types of event-based notifications, enabling extensibility to accommodate new event types, data sources, and/or communication platforms as needed.

Turning now to the ad-monitor automation client 102, the I/O controller 212 is provided to manage communications with the ad-monitor automation remote service 170. For example, the I/O controller 212 interacts with an API of (e.g., exposed by) the ad-monitor automation remote service 170 to send HTTP requests to the ad-monitor automation remote service 170 and to receive corresponding HTTP responses from the ad-monitor automation remote service 170.

The device command controller 214 is provided in the ad-monitor automation client 102 to generate client-specific commands for media access clients 106*a,b* based on remote-originated instructions or commands (e.g., cloud-based, server-issued, or user-initiated commands) received from the ad-monitor automation remote service 170. To enable compatibility with different media access clients, the device command controller 214 translates these remote-originated instructions/commands into client-specific command formats that align with the communication protocols or command structures required by each media access client 106*a, b*. The resulting commands are then transmitted by the ad-monitor automation client 102 to corresponding ones of the media access clients 106*a,b* for execution.

The network data collector 216 is provided in the ad-monitor automation client 102 to collect media asset logs from the media access clients 106*a,b*. The log parser 218 is provided in the ad-monitor automation client 102 to parse media asset logs received from media access clients (e.g., the media access client 106*b*) that use client-side ad insertion. For example, each media asset log can include an ad insertion type identifier that indicates whether that media asset log corresponds to client-side ad insertion or server-side ad insertion. When the log parser 218 detects an ad insertion type identifier indicating that a media asset log as a client-side ad insertion type, the log parser 218 parses the media asset log. In such examples, the I/O controller 212 sends the parsed media asset log to the ad-monitor automation remote service 170. However, when the log parser 218 detects an ad insertion type identifier that identifies a media asset log as a server-side ad insertion type, the log parser 218 does not parse that media asset log (e.g., the parser 218 bypasses parsing of that media asset log), and the I/O controller 212 sends the unparsed media asset log to the ad-monitor automation remote service 170. In such instances, the generic manifest manipulator parser 208 of the ad-monitor automation remote service 170 parses media asset logs corresponding to the server-side ad insertion type.

In operation, the ad-monitor automation client 102 establishes communications with one or more media access clients 106*a,b*, obtains health statuses of the one or more media access clients 106*a,b*, generates health status of itself, and registers itself and the one or more media access clients 106*a,b* with the ad-monitor automation remote service 170. For example, the I/O controller 212 registers operating system (OS) information of the ad-monitor automation client 102 and the media access clients 106*a,b* with the ad-monitor automation remote service 170 and regularly reports health statuses of the ad-monitor automation client 102 and the media access clients 106*a,b* to the ad-monitor automation remote service 170. In examples disclosed herein, health statuses include information indicative of whether the ad-monitor automation client 102 and the media access clients 106*a,b* are functioning properly and ready to participate in DAI ad monitoring. The remote command controller 206 of the ad-monitor automation remote service 170 performs health checks of the ad-monitor automation client 102 and the media access clients 106*a,b* based on the health statuses. When a health check indicates an active/healthy status of the ad-monitor automation client 102 and a media access client 106*a,b* connected to that ad-monitor automation client 102, the ad-monitor automation remote service 170 allows that media access client 106*a,b* to be selected by a user for DAI ad-monitoring tests. Accordingly, users may submit requests for DAI ad-monitoring tests to be performed in connection with the registered media access client 106*a,b*.

A user uses the GUI 202 to schedule a DAI ad-monitoring test for a particular media network (e.g., CNN, FOX, WFLD, ESPN, ABC, NBC, CBS, etc.) and/or a particular on-demand media title (e.g., a movie, a show episode, a music video, etc.) and selects a media access client 106*a,b* to use for performing the DAI ad-monitoring test. For example, the user may select to access CNN (e.g., a media network) on a Samsung TV (e.g., one of the media access clients 106*a,b*). Alternatively, a user may select to access a particular movie title on a Roku® device.

The remote command controller 206 receives an HTTP request from the GUI 202 that includes the user-requested DAI ad-monitoring test and corresponding ad-monitoring parameters. The remote command controller 206 then schedules the DAI ad-monitoring test by saving the test configuration and scheduling details to a scheduled tests table in the database 204.

The I/O controller 212 in the ad-monitor automation client 102 continuously polls (e.g., using HTTP requests) the remote command controller 206 of the ad-monitor automation remote service 170 to check whether any DAI ad-monitoring tests are scheduled in the database 204.

If the I/O controller 212 receives a response from the ad-monitor automation remote service 170 that includes a remote test command indicative of a valid scheduled DAI ad-monitoring test found for a media access client 106*a,b* (e.g., matched with media access control (MAC) addresses of the ad-monitor automation client 102 and the selected media access client 106*a,b*), the I/O controller 212 forwards the remote test command including valid scheduled DAI ad-monitoring test scheduling information (e.g., test schedule times, media network metadata, on-demand media metadata, media access client make and model details, etc.) to the device command controller 214.

The device command controller 214 generates a media access client-specific command to initialize the network data collector 216 to capture media asset logs continuously from the selected media access client 106*a,b*. For example, the device command controller 214 translates the remote test command into a format that is readable by the selected media access client 106*a,b* to generate the media access client-specific command. In examples disclosed herein, the device command controller 214 can translate the remote test command into any suitable format for any client type of media access client in communication with the ad-monitor automation client 102. For example, the device command controller 214 may be provided with libraries of media access client-specific commands or instructions to cause searching and accessing of media networks and/or media assets on different types of media access clients. The media access client-specific command is to cause the selected media access client 106*a,b* to search and access the media network and/or media assets specified in the media access client-specific command. In examples disclosed herein, the network data collector 216 is agnostic to the client type of the selected media access client 106*a,b*. For example, the network data collector 216 can capture media asset logs from any type of media access client OS. This allows comprehensive media asset log collection across different types of media access client platforms.

The device command controller 214 sends the media access client-specific command to the selected media access client 106*a,b* to initiate accessing media (e.g., media streaming, media downloading, etc.). The device command controller 214 awaits feedback from the selected media access client 106*a,b* indicative of successfully searching and tuning to the requested media network and/or media asset. If validation of searching and accessing (e.g., tuning) the requested media network and/or media asset fails, the ad-monitor automation client 102 abandons the requested DAI ad-monitoring test, and the I/O controller 212 notifies the ad-monitor automation remote service 170. The GUI 202 of the ad-monitor automation remote service 170 presents an error message indicative of the failure. In some examples, the device command controller 214 can retry sending the media access client-specific command to the selected media access client 106*a,b* multiple times (e.g., three times) to determine whether any subsequent retry produces a feedback message from the media access client 106*a,b* of successfully accessing and accessing the specified media network and/or media asset.

If the requested media network and/or media asset is successfully located and accessed, the network data collector 216 captures and stores media asset logs from the selected media access client 106*a,b*. The I/O controller 212 in the ad-monitor automation client 102 then continuously transmits relevant data to the ad-monitor automation remote service 170 such as media asset logs from the selected media access client 106*a,b*, health status (e.g., device health metrics) of the media access client 106*a,b* and the ad-monitor automation client 102, and/or other operational insights.

Example logged information in media asset logs includes network and/or advertisement parameters associated with GARs and/or ad responses. For example, the network and/or advertisement parameters may be based on a GAR specification and may include parameters such a media access network identifier (e.g., CNN, ESPN, etc.), accessing/viewing mode (e.g., a live mode, a VOD mode, a DVR mode, etc.), environment (e.g., production or staging), network ID (e.g., Ad server ID), media access client ID, media access client IP address, audience ID (e.g., a publisher-provided identifier (PPid)), unique device advertising ID (DVADID) (e.g., a device advertising ID corresponding to a media access client 106*a,b* and used for user-level addressability of advertisements), household ID (HHID) (e.g., used for household-level addressability of advertisements), opt-in privacy flag (fw_us_privacy) (e.g., present if a user has opted in to ad monitoring, otherwise user has opted out). The media access client 106*a,b* may obtain such example information in addition to any other suitable information from a GAR (or a request to access media) and/or an ad response. For the media access client 106*a*, which is a server-side ad insertion type of client, the media access client 106*a* may obtain such network and/or advertisement parameters from the manifest manipulator 104 (e.g., in a manifest with stitched ads or in a separate communication). For the media access client 106*b* which is a client-side ad insertion type of client, the media access client 106*b* may obtain such network and/or advertisement parameters when it generates a GAR and/or receives an ad response from the ad router 110.

The log parser 218 continuously polls the media asset logs saved by the network data collector 216 on the ad-monitor automation client 102 to detect logged ad breaks 124. When the log parser 218 detects a logged ad break 124 in a media asset log, the log parser 218 determines whether the media asset log corresponds to server-side ad insertion or client-side ad insertion. If the log parser 218 determines that the media asset log corresponds to client-side ad insertion, the log parser 218 parses the information in the media asset log to human-readable format. However, if the log parser 218 determines that the media asset log corresponds to server-side ad insertion, the log parser 218 does not parse the information in the media asset log. In such instances, the ad-monitor automation client 102 sends server-side ad insertion media asset logs to the ad-monitor automation remote service 170 without parsing them at the ad-monitor automation client 102.

In examples disclosed herein, the log parser 218 does not parse server-side ad insertion media asset logs at the ad-monitor automation client 102 because the automation client 102 does not have the intelligence to read server-side ad insertion media asset logs. The reason for this is that the manifest manipulator 104 performs server-side stitching of dynamic ads into the media asset 118 before delivering the media asset 118 with stitched ads to the media access client 106*a*. As such, the media access client 106*a* has no knowledge of which ads in the media asset 118 are stitched-in DAI ads from the ad router 110 and which ads are default burnt-in ads form the live source(s) 132 and/or the VOD source(s) 134. Accordingly, the media access client 106*a* logs impressions of presented ads in its media asset logs without differentiating between DAI ads and default burnt-in ads. In contrast, for client-side ad insertion, when the media access client 106*b* requests DAI ads directly from the ad router 110, the stitcher 166 performs the stitching of the DAI ads into the media asset 118 at the media access client 106*b*. As such, the media access client 106*b* knows which ads presented with the media asset 118 are stitched-in DAI ads and which are default burnt-in ads. Accordingly, the media access client 106*b* can log impressions of ads in client-side ad insertion media asset logs during such stitching based on the knowledge of which ads are DAI ads and which are default burnt-in ads.

By configuring the log parser 218 to detect server-side ad insertion media asset logs and not parse the server-side ad insertion media asset logs at the ad-monitor automation client 102, the ad-monitor automation client 102 forwards the unparsed server-side ad insertion media asset logs to the ad-monitor automation remote service 170. Accordingly, the generic manifest manipulator parser 208 of the ad-monitor automation remote service 170 can parse the server-side ad insertion media asset logs based on ad information obtained from the platform services 220, the ad server(s) 222, and/or the ad router(s) 224. For example, the generic manifest manipulator parser 208 can provide ad identifiers of ads, ad break identifiers of ad breaks 124, device advertising identifiers of media access clients 106*a,b*, and/or any other ad-related identifying information to the platform services 220, the ad server(s) 222, and/or the ad router(s) 224 to verify the ad break inclusive of GAR request/response, impressions, fill rate, etc. and generate additional ad insights.

For client-side ad insertion media asset logs parsed at the ad-monitor automation client 102, the log parser 218 performs GAR ad request and ad response verifications. For example, the log parser 218 performs verifications of network and/or advertisement parameters for GAR and ad response exchanges logged in a client-side ad insertion media asset log. Examples of such network and/or advertisement parameters are described above. The log parser 218 also performs impression verification and performs fill rate calculations. To verify GAR and ad response exchanges, the log parser 218 can verify that parameters expected to be in a GAR and/or an ad response were logged in the media asset log as actually being present in the GAR and/or the ad response.

If ad-monitoring information from an ad response is logged for a DAI ad in the client-side ad insertion media asset log, and an associated GAR is DAI-disabled (e.g., not eligible for dynamic ad selection/insertion of a DAI ad), the log parser 218 determines that the ad response indicated DAI-ineligibility for a corresponding ad break 124. The log parser 218 generates and saves an error message in the parsed media asset log indicating the DAI-ineligible ad response.

When the log parser 218 determines that parameter values do not match or that one or more parameter values is/are missing between a GAR and an ad response, the log parser 218 determines there is an incomplete record and generates and logs an error message in the parsed media asset log indicative of a potential error (e.g., an incomplete record).

Example media asset logs also include impression confirmations representative of presentations of advertisements via the media access client 106*b*. In examples disclosed herein, impression confirmations are tracking events to track the progress of an advertisement presentation via a media access client. Impression confirmations may be used as currency of digital advertisements because when they evidence presentations of corresponding advertisements, such evidence is the basis for a media provider (e.g., the live source(s) 132, the VOD source(s) 134, and/or DVR source(s)) to be paid by an advertiser for the presentation of a corresponding ad break 124. In some examples, a single impression confirmation is logged for an ad presentation. In other examples, multiple progress-impression confirmations are logged during an ad presentation to track its progress. Such multiple progress-impression confirmations can be used to confirm whether the entirety of an ad was presented (e.g., a user remained tuned to the same media network for the duration of the ad) or to determine whether less than the entire ad was presented (e.g., a user tuned the media access client 106*b* away from a media network, on-demand media asset, or a DVR media asset during the ad presentation).

Example progress-impression confirmations can be logged at periodic intervals. The duration of the periodic intervals can be based on the length of the ad spot. For example, 7.5-second intervals may be used for a 30-second advertisement, and 15-second intervals may be used for a 60-second advertisement. For a 30-second advertisement of an ad break 124, the media access client 106*b* may log a "slot start impression" confirmation at the 0-second mark of the ad break 124, log a "default impression" confirmation at the 1-second mark of an ad presented in the ad break 124, log a "first quartile impression" confirmation at the 7.5-second mark of the ad, log a "midpoint impression" confirmation at the 15-second mark of the ad, log a "third quartile impression" confirmation at the 22.5-second mark of the ad, and log a "complete impression" confirmation at the 30 s mark of the ad. For a second or any subsequent ad presented during the same ad break 124, the media access client 106*b* logs multiple progress-impression confirmations in similar manner. At the end of the ad break 124, the log parser 218 logs a slot end impression confirmation. The logging of the "default impression", the "first quartile impression", the "midpoint impression", the "third quartile impression", and the "complete impression" for an ad indicates that the entirety of the ad was presented at the media access client 106*b*.

The "slot start impression" and the "slot end impression" demarcate the beginning and end of the ad break 124 during which multiple ads can be presented. At the "slot start impression", the media access client 106*b* has not yet been served an ad. The "default impression" refers to a single instance of an ad displayed within a designated ad slot of the ad break 124. The "default impression" indicates that the ad has been served to be viewed by a user. The "first quartile impression" indicates that an ad was presented for 25% of the total ad duration. The "midpoint impression" indicates that the ad was presented for 50% of the total ad duration. The "third quartile impression" indicates that the ad was presented for 75% of the total ad duration. The "complete impression" indicates that the ad was presented for 100% of the total ad duration.

In some examples, the media access client 106*b* may also log impression confirmations for different media control events such as pause, resume, audio mute, audio unmute, rewind, fast-forward, etc. For example, if a user pauses an ad, the media access client 106*b* logs a pause impression confirmation. When the user un-pauses the ad, the media access client 106*b* logs a resume impression confirmation. If the user turns off the audio during an ad, the media access client 106*b* logs a mute impression confirmation and when the user turns the audio back on, the media access client 106*b* logs an unmute impression.

In some examples, the media access client 106*b* may also fire or transmit notifications (e.g., beacons) to third-party servers for third-party impression tracking. For example, an ad creative may cause third-party data gathering associated with its playback by the media access client 106*b*. An example of third-party impression tracking includes the use of a 1×1 tracking pixel located in the ad that causes a media access client 106*b* to transmit redirect pings to various data collection services, resellers, etc. that log impressions based on the received pings and perform analytical processes based on the logged impressions.

The ad-monitor automation client 102 collects the media asset logs from the media access client 106*b* at periodic or aperiodic intervals. For example, the ad-monitor automation client 102 may collect the media asset logs from the media access client 106*b* every 15 seconds or at any other suitable interval. For example, the ad-monitor automation client 102 may poll the media access client 106*b* every 15 seconds for the media asset logs. The log parser 218 parses client-side ad insertion media asset logs, verifies the logged advertisement information against predefined advertisement key performance indicators (KPIs), and converts the media asset logs from a media access client format to a human-readable format. The log parser 218 performs such verification processes to confirm that expected network and/or advertisement parameters are present in the media asset logs. For example, confirmation that an advertisement was presented by the media access client 106*b* may rely on the presence of particular media provider, network, and/or advertisement parameters in the media asset logs. The log parser 218 performs such verification processes to confirm that an ad response was received by the manifest manipulator 104 and/or the media access client 106*b* and was suitable for a corresponding DAI request associated with a GAR. For example, the log parser 218 can determine that the ad response was suitable if it identified an ad (e.g., a DAI ad identifier) to be presented and the correct ad break cue marker 126 of an upcoming ad break 124. The presence and/or accuracy of other parameters may also be used by the log parser 218 to determine suitableness of the ad response.

The log parser 218 may interpret the absence of any of such media provider, network, and/or advertisement parameters from a logged ad-monitoring record as a non-presentation or non-impression of an advertisement corresponding to that record. If a record in the media asset log is incomplete, the log parser 218 logs a notification in the parsed media asset log indicating a potential error or issue in the record. However, the presence of expected media provider, network, and/or advertisement parameters in the logged ad-monitoring record is interpreted by the log parser 218 as a complete record that can be used for subsequent ad-monitoring analysis.

The log parser 218 also parses through the media asset logs to determine fill rate. As used herein, fill rate means the sum total ad duration of all the ads shown during an ad break 124 divided by the ad break duration of the ad break 124. For example, if the ad break duration of an ad break 124 is 60 seconds and a first ad of 30 seconds was presented, a second ad of 15 seconds was presented, and a third ad of 6 seconds was presented for a sum total ad duration of 51 seconds (e.g., 30 seconds+15 seconds+6 seconds), the fill rate for that ad break 124 is 85% (e.g., 51/60). In some examples, the log parser 218 includes the fill rate in the parsed media asset log so that the fill rate is sent to the ad-monitor automation remote service 170.

The log parser 218 also parses through the logged advertisement information to identify incorrectly logged impressions. An impression confirmation should be logged by the media access client 106*b* only for ads that are presented. In addition, progress-impression confirmations (e.g., "default impression", "first quartile impression", "midpoint impression", "third quartile impression", and "complete impression") should be logged by the media access client 106*b* in chronological order. The log parser 218 analyzes the media asset log to determine irregularities in logging of impression confirmations and uses any such detected irregularities to determine that an ad cannot be credited as presented. In some examples, the log parser 218 determines that the media asset log does not indicate presentation of a second ad via the media access client 106*b* after the media access client 106*b* tuned away from a monitored media network, an on-demand media asset, or a DVR media asset during presentation of a first ad. For example, if a user viewing a media network via the media access client 106*b* tunes away from the media network, the on-demand media asset, or the DVR media asset during presentation of a first ad in an ad break 124 or after the presentation of the first ad is completed but before presentation of a second ad in the same ad break 124, the media access client 106*b* should not log any impression confirmations corresponding to the second ad because the second ad was not presented. However, if the log parser 218 detects one or more impression confirmations for the second ad in the media asset log, the log parser 218 determines that the record in the media asset log corresponding to the second ad is in error and, therefore, non-verifiable.

In some examples, the log parser 218 detects a tune-away event indicative of the media access client 106*b* tuning away from a first media network, a first on-demand media asset, or a first DVR media asset to a second media network, a second on-demand media asset, or a second DVR media asset by continuously reading metadata from the media access client 106*b* to identify the media network, the on-demand media asset, or the DVR media asset that is actively presented. The log parser 218 detects changes to accessed media networks, on-demand media assets, or DVR media assets by monitoring changes in media network metadata and logs tune-away events in parsed media asset logs to indicate the media access client 106*b* has tuned away. Such tune-away events may be displayed by the ad-monitor automation remote service 170 in the GUI 202. In other examples, the log parser 218 detects a tune-away event by analyzing the media asset log generated by the media access client 106*b* to detect impressions logged for all of a first ad in an ad break 124 and no impressions for a second ad (e.g., provided the ad break 124 has two sets of ads in an ad response).

Based on the verification process, the log parser 218 keeps successfully verified records in the parsed media asset logs. In examples disclosed herein, the log parser 218 also keeps records that are unverifiable due to potential errors in the media asset logs and generates a report indicating the potential errors or issues in the unverifiable records. The I/O controller 212 generates one or more HTTP requests and adds parsed client-side ad insertion media asset logs and unparsed server-side ad insertion media asset logs into one or more payload fields of the one or more HTTP requests. The I/O controller 212 then sends the parsed and unparsed media asset logs in the HTTP requests to the ad-monitor automation remote service 170 to be persisted in the database 204. In some examples, the ad-monitor automation remote service 170 displays information related to the media asset logs in the GUI 202.

In some examples, parsed client-side ad insertion media asset logs transmitted to the ad-monitor automation remote service 170 are further processed by the generic manifest manipulator parser 208. For example, different media access clients 106*a,b* can use different manifest manipulators (e.g., the manifest manipulator agent 168) that handle DAI ad insertion differently. Such differences between different parsed media asset logs can be identified and further parsed by the generic manifest manipulator parser 208 at the ad-monitor automation remote service 170. For example, the generic manifest manipulator parser 208 can perform deep insights analyses on sequences of Video Ad Serving Template (VAST) ads and/or Video Multi-Screen Ad Playlist (VMAP) ads received. VAST is a template used to structure ad tags that serve video and audio ads to media access clients 106*a,b*. VMAP is an extensible markup language (XML) response framework that defines where to place ads within video (e.g., an XML structure for a playlist of video ads sent from an ad server to a media access client) served to media access clients 106*a,b*. However, examples disclosed herein are not limited to XML-based formats. Examples disclosed herein may also support alternative or emerging formats such as JavaScript Object Notation (JSON) or other structured data representations used for ad delivery metadata.

The generic manifest manipulator parser 208 can also analyze the parsed client-side ad insertion media asset logs for fall back ads sent for primary ads, ad transcoding failures, empty VAST tags, and ad request failures. Example ad request failures may result from empty ad responses, timed out ad responses (e.g., an ad response is not received by a media access client 106*a,b* before a timeout event), and not actioned ad responses (e.g., a media access client 106*a,b* took on action on a received ad response).

After the ad-monitor automation remote service 170 receives unparsed server-side ad insertion media asset logs from the ad-monitor automation client 102, the generic manifest manipulator parser 208 can parse the unparsed server-side ad insertion media asset logs using the same parsing and analyses described above as performed by the log parser 218 on client-side ad insertion media asset logs and as performed by the generic manifest manipulator parser 208 on parsed client-side ad insertion media asset logs. In addition, the generic manifest manipulator parser 208 can parse server-side ad insertion media asset logs and further parse parsed client-side ad insertion media asset logs as described below.

The ad-monitor automation remote service 170 interacts with internal and external systems (e.g., the platform service(s) 220, the ad server(s) 222, the ad router(s) 224, and the monitoring dashboard(s) 226) to ensure macro trends and micro trends are correlated. For example, the ad-monitor automation remote service 170 can communicate with the platform services 220 so that the generic manifest manipulator parser 208 can ensure that an ad break 124 was signaled and actioned at the correct time and duration within a media asset 118 by a media access client 106*a,b* and to ensure that the correct ad duration was set for media networks that participate in DAI-enabled ad breaks. As another example, the ad-monitor automation remote service 170 can communicate with the ad router(s) 224 so that the generic manifest manipulator parser 208 can verify that the ad router(s) 224 sent the request to the correct ad server 222. As yet another example, the ad-monitor automation remote service 170 can communicate with the ad server 222 so that the generic manifest manipulator parser 208 can gather the final ad request that was sent to the ad server 224 and validate parameters. Example validations that can be performed by the generic manifest manipulator parser 208 include ad server request and response validation and hard inter-connect ad server request and response validation. Example ad server request parameters that can be validated by the generic manifest manipulator parser 208 include video taxonomy parameters (e.g., video genre, video rating, video series), custom site section ID (CSID), custom content video asset ID (CAID), pre-bid validation (e.g., key value pairs indicating a successful bid request), and/or a site section tag. The ad-monitor automation remote service 170 also communicates with the ad server 222 so that the generic manifest manipulator parser 208 can gather data on types of ads trafficked (e.g., scheduled), gather data of supply-side and demand-side platforms connected to the ad server(s) 222. As another example, the ad-monitor automation remote service 170 can communicate with the monitoring dashboard(s) 226 to monitor the number of ad requests, ad starts, etc.

In examples disclosed herein, a site section tag (e.g., a custom site section ID (CSID)) refers to a string used to uniquely target and report ads within an ad server ecosystem. The site section tag may include a media access client ID (e.g., to identify which media access client is playing the ad), a network ID (e.g., identifying the network on which the ad is served/seen), and an accessing/viewing mode used by an audience member to access the channel (e.g., LIVE, VOD, DVR, etc.). An example site section tag string is "bbtv_firetv_watch_live_espn." In this example, "bbtv" is a parameter value of a media access platform (e.g., DirecTV® Stream App). Also in this example, "watch_live" is a parameter value of an accessing/viewing mode parameter and is indicative that an audience member is tuned to a live channel. The accessing/viewing mode parameter value is dynamic and is based on the viewing mode selected by an audience member and/or based on the type of media that is requested by the audience member. In addition, "firetv" is a parameter value that represents an OTT media access client. In addition, "espn" is a parameter value of a network name parameter and is indicative that the audience member accessed the ESPN television channel/stream. The network name parameter value is dynamic and is based on which channel/stream the audience member accessed.

In the illustrated example, the generic manifest manipulator parser 208 stores verification results in the database 204 and displays the verification results via the GUI 202. The service I/F 211 is configured to send automated alerts and notifications to subscribed users in response to detected anomalies or notable events. These notifications can be delivered through a variety of communication technologies, including but not limited to internet-based, cloud-based, telecommunications-based platforms, and/or social media-based platforms. Supported delivery channels may include short message service (SMS), iMessage, email, push notifications, in-app alerts, mobile alerts, Slack messages, Microsoft Teams messages, or any other messaging, collaboration, and/or notification service. For example, the service I/F 211 may send alerts to designated user groups responsible for monitoring DAI ad insertion. In some examples, different user groups or distribution lists may be configured based on the media provider and/or specific monitoring criteria. Notifications may include, but are not limited to, alerts for nonstandard ads, repeated ads, insufficient ad load, network issues, error impressions, ad request parameter failures, loud ads, impression verification failures, and/or any other suitable events. A nonstandard ad notification refers to an ad having a duration other than predefined or standard durations for an ad break 124. In some examples, predefined or standard durations of ads are multiples of 15 seconds (e.g., 15 seconds(s), 30 s, 45 s, 60 s, 75 s, and 90 s). Example durations of non-standard ads include 6 s, 8 s, 9 s, 10 s, 21 s, or any other duration that is not a predefined duration established by, for example, a media provider (e.g., the live source(s) 132, the VOD source(s) 134, DVR media source(s), etc.). A repeated ad notification refers to an ad that has been repeated more than a threshold frequency within a particular duration or that was repeated in the same ad break 124. An insufficient ad load notification represents a fill rate that is less than a duration of a corresponding ad break 124 (e.g., less than 100% of the ad break 124).

A network issue notification is indicative of an ad having been affected by a possible network failure or other network problem. In some examples, a network issue corresponds to a timeout because a media access client 106*a,b* did not receive a response within a threshold duration from the impression host identified in an ad response (e.g., inclusive of creative universal resource locators (URLs), Freewheel® impressions, and third-party impressions). A network issue notification and/or an error impression notification is/are indicative of an ad impression having been affected by a possible certificate issue or a failure to connect to the impression host identified in an ad response. A loud ads notification corresponds to an ad that does not have an audio volume that substantially matches corresponding content 122 (e.g., in the media asset 118 of FIG. 1). For example, the generic manifest manipulator parser 208 may generate a loud ad notification in response to an ad having an audio volume that exceeds a loudness threshold that is greater than a loudness of corresponding content 122, and the service I/F 211 can send the loud ad notification to one or more users registered to receive such notifications. In some examples, a loudness threshold is −24 to −26 LKFS (Loudness, K-weighted, relative to full scale) such that an audio volume greater than −26 LKFS triggers a loud ad notification.

An ad request parameter failure notification is indicative that an ad request parameter is missing or invalid in the logged advertisement information (e.g., the GAR is missing a media access client identifier or the GAR has an invalid 'on-demand media title ID', 'media network ID', or 'mode'). An impression verification failure notification is used to indicate that a media asset log includes a logged ad request (e.g., a GAR) and a logged ad response when there was a successful GAR and a corresponding DAI ad was presented but that the media asset log is missing a corresponding logged impression confirmation (e.g., no impression was recorded or that insufficient impression confirmations were recorded for the logged GAR and ad response). This is useful information because a media provider relies on logged impressions as evidence that an advertiser's ad was presented so that the media provider can request payment for that presented ad from the advertiser. In some examples, a media provider gets paid by an advertiser based on logging of a "default impression" described above. In other examples, a media provider gets paid by an advertiser only if all progress-impressions (e.g., the "default impression", the "first quartile impression", the "midpoint impression", the "third quartile impression", and the "complete impression") for an ad are logged. In such examples, an ad request parameter and impression verification failure notification is indicative that less than all progress-impressions (e.g., the "default impression", the "first quartile impression", the "midpoint impression", the "third quartile impression", and the "complete impression") for an ad were logged.

Based on the alerts/notifications, one or more components of the media distribution system 100 may be re-configured or adjusted to correct how the media distribution system 100 performs ad-selections and/or ad-presentations. In some examples, schedule information corresponding to ad break cue markers 126 may be updated in the break information system 142 to correctly identify ad breaks 124 and schedule information for DAI. Additionally or alternatively, audience profile information may be adjusted in the subscriber information database 146 to more accurately represent audience members.

The ad data insights manager 210 is capable of storing, retrieving, and analyzing media asset logs to provide ad insights. Example ad insights include ad load (e.g., ads served per minute), number of ads served per ad break 124, number of nonstandard ad break durations, number of incorrect ad break durations (e.g., a negative five minute (−5 min) ad break), and types of ads served. To analyze ad load, a 60-second ad break duration can present ads in any suitable ad sequence such as: example sequence (ad1=30 s, ad2=30 s), example sequence (ad1=15 s, ad2=30 s, ad3=15 s), example sequence (ad1=15 s, ad2=15 s, ad3=15 s, ad4=15 s), example sequence (ad1=15 s, ad1=45 s), example sequence (ad1=60 s), etc. which result in an average of 2.4 ads per minute. In analyzing types of ads served, example types of ads include direct response ads, programmatic ads, hard interconnect ads, and local ads. The ad data insights manager 210 can show the type of ad served based on the creative URL (e.g., a creative from Publica (supply-side platform (SSP)), a Google ad server (Google Ad Manager (GAM) tag), etc.) captured in a media asset log received from the ad-monitor automation client 102. In some examples, the ad data insights manager 210 can show trends on alerts that the ad-monitor automation remote service 170 is sending per media access client 106*a,b* over a time period (e.g., a week, a month, etc.) and decipher any alerts that are increasing or decreasing over comparable time periods (e.g., Month-on-Month (MoM), Week-on-Week (WoW), Year-on-Year (YoY), etc.).

The ad-monitor automation client 102 and the ad-monitor automation remote service 170 of FIGS. 1 and 2 may be instantiated (e.g., creating an instance of, bring into being, materialize, implement, etc.) by corresponding programmable circuitry such as a Central Processor Unit (CPU) executing instructions. Additionally or alternatively, the ad-monitor automation client 102 and the ad-monitor automation remote service 170 of FIGS. 1 and 2 may be instantiated (e.g., creating an instance of, bring into being, materialize, implement, etc.) by corresponding ones of (i) an Application Specific Integrated Circuit (ASIC) and/or (ii) a Field Programmable Gate Array (FPGA) structured and/or configured to perform operations of the ad-monitor automation client 102 and/or the ad-monitor automation remote service 170. It should be understood that some or all of the circuitry of FIG. 2 may be instantiated at the same or different times. Moreover, in some examples, some or all of the circuitry of FIG. 2 may be implemented by microprocessor circuitry executing instructions and/or FPGA circuitry performing operations to implement one or more virtual machines and/or containers.

Figure 3A:
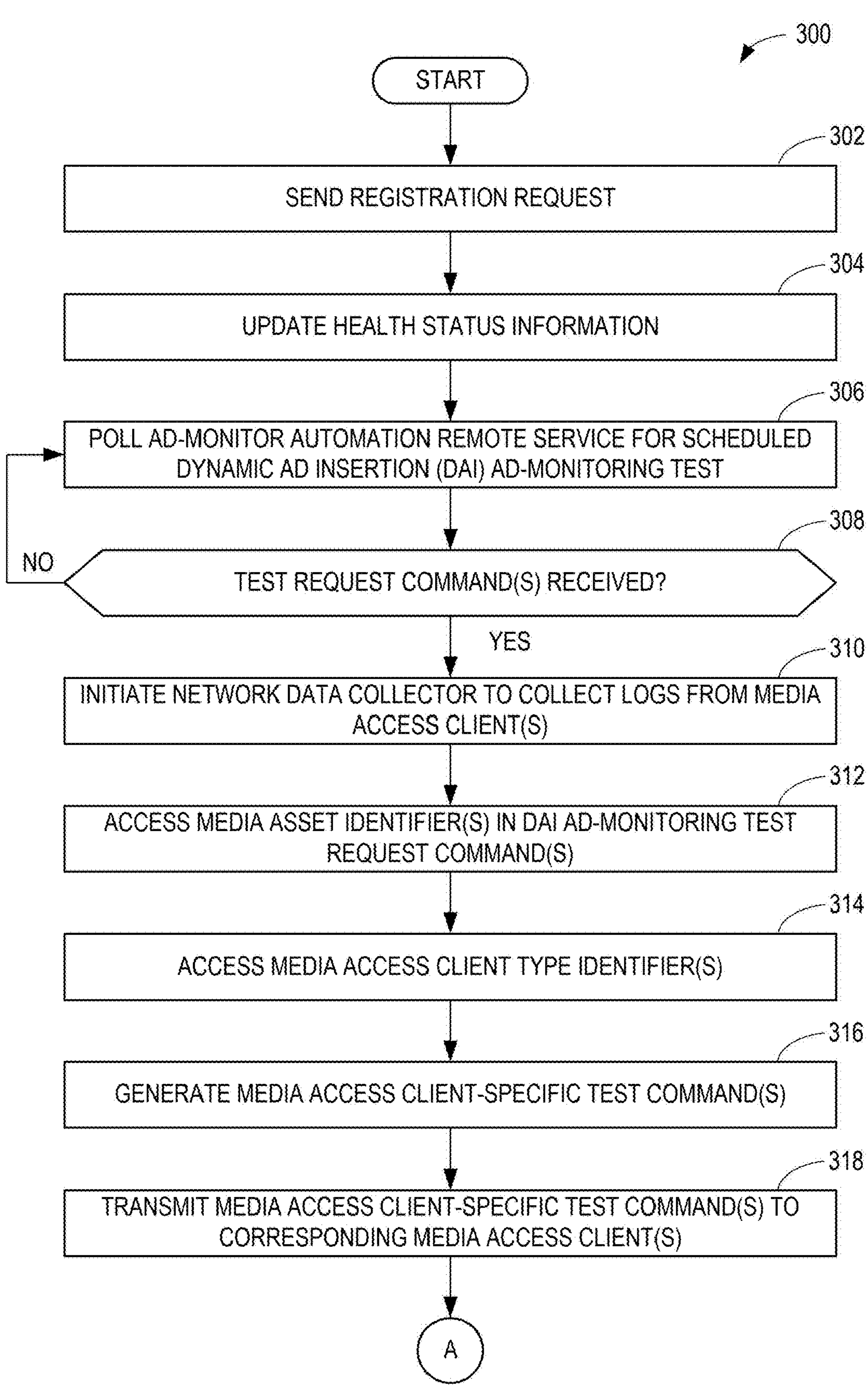
FIGS. 3A and 3B include a flowchart representative of example machine-readable instructions and/or example operations that may be executed, instantiated, and/or performed by example programmable circuitry to implement the ad-monitor automation client of FIGS. 1 and 2.
Figure 3B:
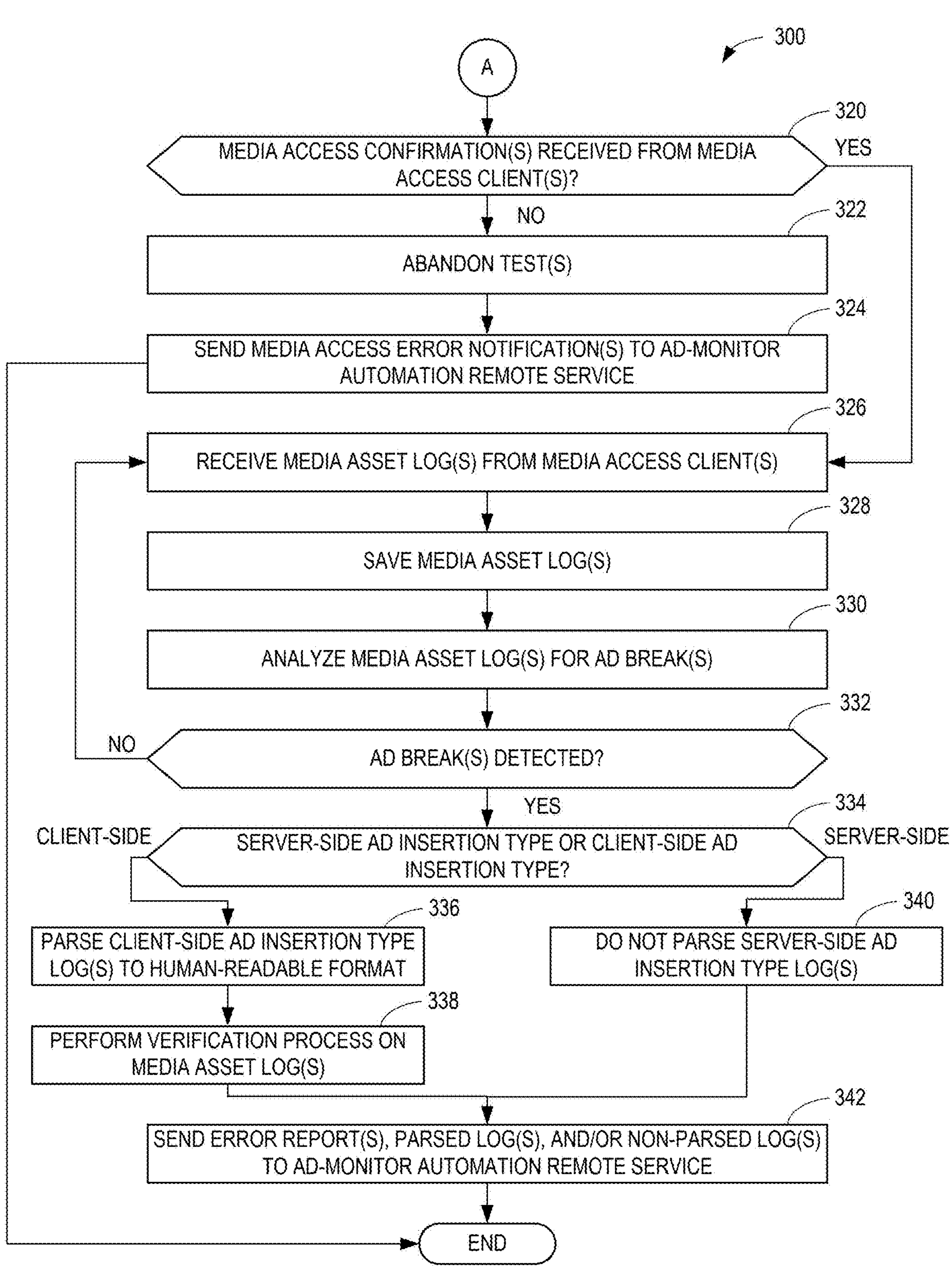
Figure 4:
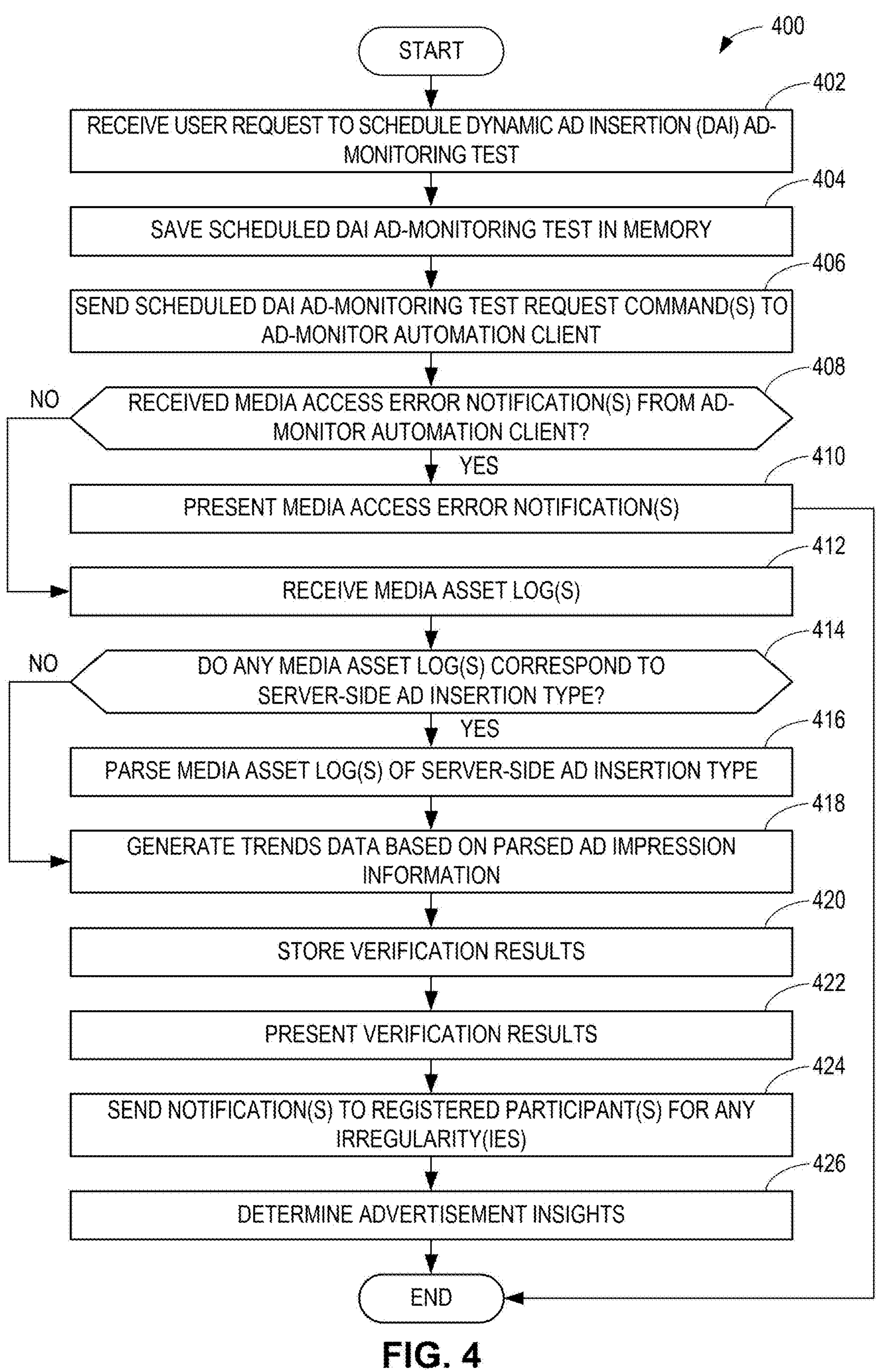
FIG. 4 is a flowchart representative of example machine-readable instructions and/or example operations that may be executed, instantiated, and/or performed by example programmable circuitry to implement the ad-monitor automation remote service of FIGS. 1 and 2.

In some examples, the database 204, the remote command controller 206, the generic manifest manipulator parser 208, the ad data insights manager 210, the service I/F 211, the I/O controller 212, the device command controller 214, the network data collector 216, and the log parser 218 are circuitry (e.g., the database circuitry, the remote command controller circuitry, the generic manifest manipulator parser circuitry, the ad data insights manager circuitry, the I/O controller circuitry, the device command controller circuitry, the network data collector circuitry, and the log parser circuitry) instantiated by programmable circuitry executing instructions and/or configured to perform operations such as those represented by the flowcharts of FIGS. 3A, 3B, and 4.

As described above, the GUI 202, the database 204, the remote command controller 206, the generic manifest manipulator parser 208, the ad data insights manager 210, the service I/F 211, the I/O controller 212, the device command controller 214, the network data collector 216, and the log parser 218 of FIG. 2 are structures. Such structures may implement means for performing corresponding disclosed functions. Examples of such functions are described above in connection with corresponding ones of the example the GUI 202, the database 204, the remote command controller 206, the generic manifest manipulator parser 208, the ad data insights manager 210, the service I/F 211, the I/O controller 212, the device command controller 214, the network data collector 216, and the log parser 218 and are described below in connection with the flowcharts of FIGS. 3A, 3B, and 4.

While an example manner of implementing the ad-monitor automation client 102 and the ad-monitor automation remote service 170 of FIG. 1 is illustrated in FIG. 2, one or more of the elements, processes, and/or devices illustrated in FIG. 2 may be combined, divided, re-arranged, omitted, eliminated, and/or implemented in any other way. Further, the database 204, the remote command controller 206, the generic manifest manipulator parser 208, the ad data insights manager 210, the service I/F 211, the I/O controller 212, the device command controller 214, the network data collector 216, and the log parser 218, and/or, more generally, the example ad-monitor automation client 102 and/or the ad-monitor automation remote service 170 of FIG. 2, may be implemented by hardware alone or by hardware in combination with software and/or firmware. Thus, for example, any of the database 204, the remote command controller 206, the generic manifest manipulator parser 208, the ad data insights manager 210, the service I/F 211, the I/O controller 212, the device command controller 214, the network data collector 216, and the log parser 218, and/or, more generally, the example ad-monitor automation client 102 and/or the ad-monitor automation remote service 170, could be implemented by programmable circuitry, processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs in combination with machine-readable instructions (e.g., firmware or software). Further still, the example ad-monitor automation client 102 and the ad-monitor automation remote service 170 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine-readable instructions, which may be executed by programmable circuitry to implement and/or instantiate the ad-monitor automation client 102 and the ad-monitor automation remote service 170 of FIG. 2 and/or representative of example operations which may be performed by programmable circuitry to implement and/or instantiate the ad-monitor automation client 102 and the ad-monitor automation remote service 170 of FIG. 2, are shown in FIGS. 3A, 3B, and 4. The machine-readable instructions may be one or more executable program(s) or portion(s) of one or more executable program(s) for execution by programmable circuitry such as the programmable circuitry 512 shown in the example processor platform 500 discussed below in connection with FIG. 5 and/or may be one or more function(s) or portion(s) of functions to be performed by other programmable circuitry (e.g., an FPGA). In some examples, the machine-readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer readable and/or machine-readable storage media such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, read-only memory (ROM), a solid-state drive (SSD), non-volatile memory (e.g., electrically erasable programmable ROM (EEPROM), flash memory, etc.), volatile memory (e.g., Random Access Memory (RAM) of any type, etc.), and/or any other storage device or storage disk. The non-transitory computer readable storage medium may include one or more mediums and/or types of mediums. The instructions of the non-transitory computer readable and/or machine-readable medium may be executed and/or instantiated by one or more hardware devices other than the programmable circuitry and/or may be embodied in dedicated hardware. For example, any or all of the blocks of the flowchart(s) may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform corresponding operations without executing software or firmware.

Although the example program(s) is/are described with reference to the flowchart(s) illustrated in FIGS. 3A, 3B, and 4, many other methods of implementing the example ad-monitor automation client 102 and the ad-monitor automation remote service 170 may alternatively be used. For example, the order of execution of the blocks of the flowchart(s) may be changed, and/or some of the blocks described may be changed, eliminated, or combined.

The machine-readable instructions may be distributed across multiple hardware devices and/or executed by two or more hardware devices (e.g., a server and a client hardware device). The programmable circuitry may be distributed in different network locations and/or may be local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

Machine-readable instructions as described herein may be stored as data and/or in a data structure (e.g., as portion(s) of instructions, code, representations of code, etc.) on one or more storage devices, disks and/or computing devices (e.g., servers) located at the same or different locations of a network or collection of networks (e.g., in the cloud, in edge devices, etc.).

The machine-readable instructions described herein can be written or represented using any suitable previously developed or future-developed instruction language, scripting language, programming language, query language, or database language, including, for example, C, C++, Java, C-Sharp, Perl, Python, JavaScript, TypeScript, HyperText Markup Language (HTML), Swift, Go (Golang), Rust, Bash, PowerShell, Ruby, Kotlin, Scala, PHP (Hypertext Preprocessor), Objective-C, R, Lua, Julia, MATLAB, Solidity, and any other language suitable for implementing the described functionality. This also includes database query languages, both structured and non-structured, such as Structured Query Language (SQL) and its extensions (Procedural Language/SQL (PL/SQL), Transact-SQL (T-SQL)), as well as non-structured database (DB) query languages, including MongoDB Query Language (MQL), Cassandra Query Language (CQL), Cypher (Neo4j), Gremlin, Redis command line interface (CLI) commands, DynamoDB API queries, MapReduce-based query frameworks, GraphQL, SPARQL, XQuery, JavaScript Object Notation Path (JSONPath), JSONiq, and Datalog, among any other present or future-developed query languages applicable to structured, semi-structured, and/or unstructured databases. Additionally, this may include languages and technologies used in artificial intelligence (AI), machine learning (ML), blockchain, and big data processing, such as TensorFlow scripts, PyTorch scripts, Apache Spark SQL, HiveQL, Solidity, Rust, Move, and other future-developed or domain-specific languages relevant to data processing, smart contracts, and/or computational modeling.

As mentioned above, the example operations of FIGS. 3A, 3B, and 4 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. As used herein, the terms "non-transitory computer-readable storage device" and "non-transitory machine readable storage device" are defined to include any physical (mechanical, magnetic and/or electrical) hardware to retain information for a time period, but to exclude propagating signals and to exclude transmission media. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc. As used herein, the term "storage disk" refers to a physical structure containing information storage elements to which information can be written and persisted for subsequent retrieval by a computer or other hardware platform. Examples of non-transitory computer-readable medium, non-transitory computer-readable storage medium, non-transitory machine-readable medium, non-transitory machine-readable storage medium, non-transitory computer-readable storage devices, non-transitory machine-readable storage devices, non-transitory computer-readable storage disk, and/or non-transitory machine-readable storage disk include any one of or combination of random access memory (RAM) of any type, read only memory (ROM) of any type, solid state memory, flash memory, optical discs (e.g., a CD, a DVD, etc.), magnetic disks (e.g., magnetic HDDs), disk drives, cache, registers, redundant array of independent disks (RAID) systems, and/or any other non-transitory computer-readable and/or machine-readable media in which information is stored for any duration (e.g., for extended time periods, permanently, for brief instances, for temporarily buffering, and/or for caching of the information).

FIGS. 3A and 3B include a flowchart representative of example machine-readable instructions and/or example operations 300 that may be executed, instantiated, and/or performed by example programmable circuitry to implement the ad-monitor automation client of FIGS. 1 and 2. The example machine-readable instructions and/or the example operations 300 begin at block 302, at which the I/O controller 212 sends a registration request to the ad-monitor automation remote service 170. For example, the registration request includes a request to register the ad-monitor automation client 102 and one or more of the media access clients 106*a,b* with the ad-monitor automation remote service 170. At block 304, the I/O controller 212 updates health status information. For example, the I/O controller 212 sends media access client health status information of the one or more media access clients 106*a,b* and/or an automation client health status of the ad-monitor automation client 102 to the ad-monitor automation remote service 170. Some examples of health status information include heartbeat of the ad-monitor automation client 102, connectivity to media access clients 106*a,b* (e.g., determined by pinging the media access clients 106*a,b*), and Internet speed/latency.

At block 306, the I/O controller 212 polls the ad-monitor automation remote service 170 for scheduled DAI ad-monitoring tests. For example, the I/O controller 212 polls the ad-monitor automation remote service 170 via an HTTP request to determine whether any users have created and scheduled DAI ad-monitoring tests in the database 204 of the ad-monitor automation remote service 170. At block 308, the I/O controller 212 determines whether it has received one or more DAI ad-monitoring test request command(s) (e.g., remote-originated command(s)). For example, if a user has created and scheduled a DAI ad-monitoring test in the database 204, the ad-monitor automation remote service 170 responds to polling of the I/O controller 212 of block 306 by sending the ad-monitor automation client 102 a DAI ad-monitoring test request command in an HTTP response. In some examples, the ad-monitor automation remote service 170 may respond by sending the ad-monitor automation client 102 multiple DAI ad-monitoring test request commands for DAI ad-monitoring tests scheduled in the database 204.

If the I/O controller 212 determines that it has not received a DAI ad-monitoring test command (block 308: No), control returns to block 306 at which the I/O controller 212 polls the ad-monitor automation remote service 170 again. Otherwise, when the I/O controller 212 determines that it has received a DAI ad-monitoring test command (block 308: Yes), control advances to block 310 at which the I/O controller 212 initiates the network data collector 216 to collect media asset logs from one or more media access clients 106*a,b*. At block 312, the I/O controller 212 accesses a media asset identifier in the DAI ad-monitoring test request command. For example, the media asset identifier may be a media network identifier, a television network identifier, or a media title of an on-demand media asset (or a DVR media asset).

At block 314, the device command controller 214 accesses media access client type identifier(s) in the DAI ad-monitoring test request command. For example, a media access client type identifier identifies the make and/or model of a media access client 106*a,b*. At block 316, the device command controller 214 generates a media access client-specific DAI ad-monitoring test command. For example, the device command controller 214 generates the media access client-specific test command (e.g., a media access client-specific DAI ad-monitoring test command) based on the media access client type identifier in the DAI ad-monitoring test request command. In the example of FIGS. 3A and 3B, the device command controller 214 includes the media asset identifier in the media access client-specific test command.

At block 318, the device command controller 214 causes the ad-monitor automation client 102 to transmit the media access client-specific test command to a media access client 106*a,b* of a media access client type corresponding to the media access client type identifier in the DAI ad-monitoring test request command. For example, the device command controller 214 can access an internet protocol (IP) address of the target media access client 106*a,b* from the DAI ad-monitoring test request command and cause the transmission of the media access client-specific test command to the media access client 106*a,b* corresponding to the IP address. In other examples, the device command controller 214 control transmission of the media access client-specific test command to the media access client 106*a,b* based on serial number, unique device identifier (UDID), etc. of the target media access client 106*a,b* for wire-connected media access clients. In some examples, the device command controller 214 causes transmission of multiple media access client-specific test commands to corresponding media access clients 106*a,b*.

At block 320, the network data collector 216 determines whether a media access confirmation is received from the target media access client 106*a,b*. For example, a media access confirmation confirms that the target media access client 106*a,b*, to which the media access client-specific test command was sent, was able to successfully access a media asset corresponding to the media asset identifier. In some examples, the network data collector 216 may receive multiple media access confirmations from multiple target media access clients 106*a,b* to which media access client-specific test commands were sent.

If the network data collector 216 determines that it has received a media access confirmation (block 320: Yes), control advances to block 326 described below. Otherwise, if the network data collector 216 determines that it has not received a media access confirmation (block 320: No), the ad-monitor automation client 102 abandons the test (block 322). In some examples, the ad-monitor automation client 102 abandons multiple tests if media access confirmations are not received for any of the tests. At block 324, the I/O controller 212 sends one or more media access error notification(s) to the ad-monitor automation remote service 170. For example, a media access error notification informs the ad-monitor automation remote service 170 that a target media access client was not able to access the requested media. The example instructions and/or operations 300 then end.

Turning to block 326, after receipt of a successful media access confirmation at block 320, the network data collector 216 receives/accesses one or more media asset log(s) generated by the media access client(s) 106*a,b*. For example, the media asset log(s) is/are based on the media access client(s) 106*a,b* accessing media (e.g., a media network, a digital television media provider, a media title, etc.) corresponding to the media asset identifier(s) provided in the media access client-specific test command(s) transmitted at block 318. In some examples, the network data collector 216 accesses a client-side ad insertion media asset log from the media access client 106*b* and a server-side ad insertion media asset log from the media access client 106*a*. At block 328, the network data collector 216 saves the media asset log(s).

At block 330, the log parser 218 analyzes the media asset log(s) for logged ad break(s) 124. If the log parser 218 does not detect logged ad break(s) 124 (block 332: No), control returns to block 326 to access additional media asset log(s). Otherwise, if the log parser 218 does detect logged ad break(s) 124 (block 332: Yes), control advances to block 334 at which the log parser 218 analyzes each media asset log in which a logged ad break 124 was detected to determine whether that media asset log corresponds to server-side ad insertion or client-side ad insertion. For example, the log parser 218 may read an ad insertion type identifier in a media asset log to identify whether the media asset log is a server-side ad insertion type of log or a client-side ad insertion type of log.

For media asset log(s) that the log parser 218 determines is/are a client-side ad insertion type of log (block 334: client-side), control advances to block 336 at which the log parser 218 parses the client-side ad insertion type log(s) to human-readable format. At block 338, the log parser 218 performs a verification process on the media asset log(s) identified as client-side ad insertion type. For example, the log parser 218 performs a verification process to perform GAR ad request and ad response verifications, impression verification, fill rate calculations, and/or any other verifications described above.

For media asset log(s) that the log parser 218 determines is/are a server-side ad insertion type of log (block 334: server-side), control advances to block 340 at which the log parser 218 does not parse the server-side ad insertion type log(s). At block 342, the I/O controller 212 sends/transmits error report(s), parsed client-side ad insertion media asset log(s), and/or non-parsed server-side ad insertion media asset log(s) to the ad-monitor automation remote service 170. For example, the transmitted error report(s) correspond(s) to results of the verification process at block 338, the parsed client-side ad insertion media asset log(s) are transmitted after parsing at block 336 based on media asset log(s) identified as being a client-side ad insertion media asset type of log, and the non-parsed server-side ad insertion media asset log(s) are transmitted after the log parser 218 identifies media asset log(s) at block 334 that are a server-side ad insertion media asset type of log. The example instructions and/or operations 300 end.

FIG. 4 is a flowchart representative of example machine-readable instructions and/or example operations 400 that may be executed, instantiated, and/or performed by example programmable circuitry to implement the ad-monitor automation remote service 170 of FIGS. 1 and 2. The example instructions and/or operations 400 begin at block 402 at which the GUI 202 receives a user request to schedule a DAI ad-monitoring test. At block 404, the database 204 saves the scheduled DAI ad-monitoring test in memory or storage. At block 406, the remote command controller 206 sends one or more scheduled DAI ad-monitoring test request command(s) to the ad-monitor automation client 102. For example, the remote command controller 206 can send the scheduled DAI ad-monitoring test request command(s) to the ad-monitor automation client 102 in one or more HTTP response(s) in response to receiving an HTTP request in which the ad-monitor automation client 102 polls for any scheduled DAI ad-monitoring tests.

At block 408, the remote command controller 206 determines whether it has received any media access error notification(s) from the ad-monitor automation client 102. For example, the remote command controller 206 may receive media access error notification(s) corresponding to some commands sent at block 406 and/or not receive any media access error notification corresponding to others of the commands sent at block 406. If the remote command controller 206 has received one or more media access error notification(s) from the ad-monitor automation client 102 (block 408: Yes), control advances to block 410 at which the GUI 202 presents the media access error notification(s). If the remote command controller 206 has not received a media access error notification corresponding to at least one of the command(s) sent at block 406 (block 408: No), control advances to block 412 at which the generic manifest manipulator parser 208 receives/accesses one or more media asset log(s).

At block 414, the generic manifest manipulator parser 208 determines whether any media asset log(s) correspond to the server-side ad insertion type. If the generic manifest manipulator parser 208 determines that none of the media asset log(s) correspond to the server-side ad insertion type (block 414: No), control advances to block 418 described below. If the generic manifest manipulator parser 208 determines that one or more media asset log(s) correspond to the server-side ad insertion type (block 414: Yes), control advances to block 416 at which the generic manifest manipulator parser 208 parses the server-side ad insertion media asset log(s). For example, during the parsing, the generic manifest manipulator parser 208 performs verification processes on the parsed ad impression information and generates verification results.

At block 418, the generic manifest manipulator parser 208 generates trend data based on parsed ad impression information for both client-side ad insertion parsed logs and server-side ad insertion parsed logs. At block 420, the database 204 stores verification results in, for example, memory or storage corresponding to the database 204. For example, the database 204 stores the verification results generated by the generic manifest manipulator parser 208 based on server-side ad insertion media asset logs and stores verification results generated by the ad-monitor automation client 102 based on client-side ad insertion media asset logs. At block 422, the GUI 202 presents the verification results. At block 424, the service I/F 211 sends one or more notification(s) to registered participant(s) for any irregularity(ies) in one or more media asset log(s). At block 426, the ad data insights manager 210 generates advertisements insights data based on parsed ad impression information. The example instructions and/or operations 400 of FIG. 4 end.

Figure 5:
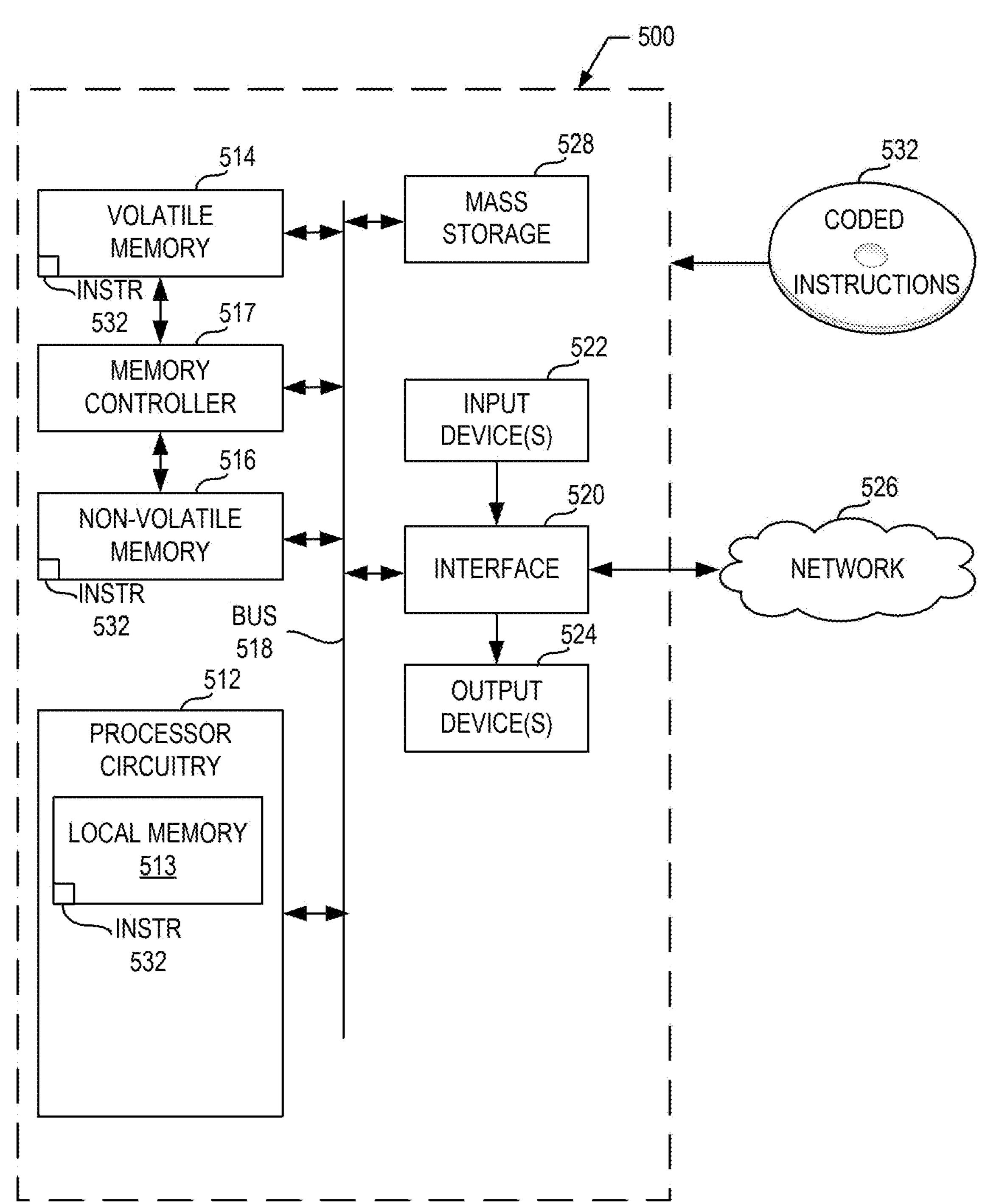
FIG. 5 is a block diagram of an example processing platform including programmable circuitry structured to execute, instantiate, and/or perform the example machine-readable instructions and/or perform the example operations of FIGS. 3A, 3B, and 4 to implement the ad-monitor automation client and the ad-monitor automation remote service 170 of FIGS. 1 and 2.

FIG. 5 is a block diagram of an example programmable circuitry platform 500 structured to execute and/or instantiate the example machine-readable instructions and/or the example operations of FIGS. 3A, 3B, and 4 to implement the ad-monitor automation client 102 and/or the ad-monitor automation remote service 170 of FIG. 2. The programmable circuitry platform 500 can be, for example, a server, a personal computer, a workstation, a self-learning machine (e.g., a neural network), an Internet appliance, or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAS, microprocessors, CPUs, GPUs, DSPs, XPUs, and/or microcontrollers from any desired family or manufacturer. The programmable circuitry 512 may be implemented by one or more semiconductor based (e.g., silicon based) devices. In this example, when the programmable circuitry 512 implements the ad-monitoring automation remote service 170, the programmable circuitry implements the GUI 202, the database 204, the remote command controller 206, the generic manifest manipulator parser 208, the ad data insights manager 210, and the service I/F 211. When the programmable circuitry 512 implements the ad-monitoring automation client 102, the programmable circuitry 512 implements the I/O controller 212, the device command controller 214, the network data collector 216, and the log parser 218.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or a speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices, optical storage devices, RAID systems, and/or solid-state storage discs or devices such as flash memory devices and/or SSDs.

The machine-readable instructions 532, which may be implemented by the machine-readable instructions of FIGS. 3A, 3B, and 4, may be stored in the mass storage device 528, in the volatile memory 514, in the non-volatile memory 516, and/or on at least one non-transitory computer readable storage medium which may be removable.

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In some examples, the programmable circuitry 512 of FIG. 5 may be in one or more packages.

Figure 6:
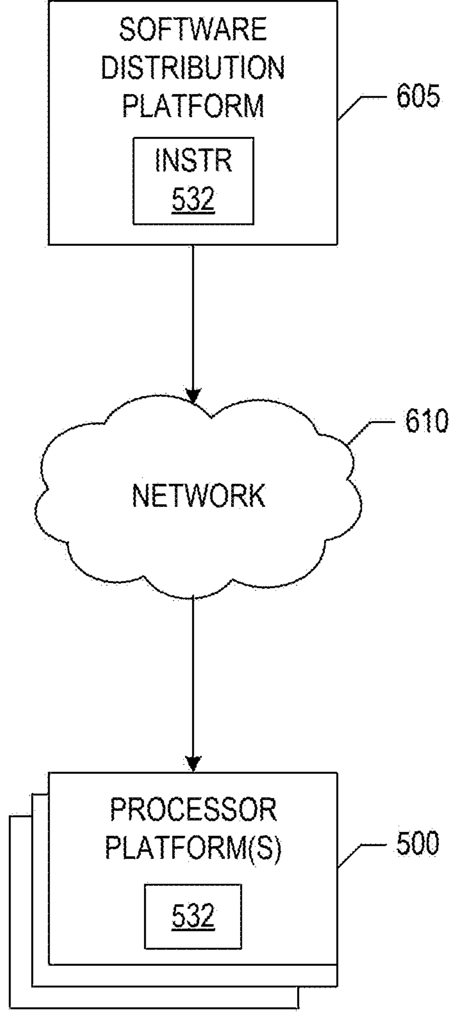
FIG. 6 is a block diagram of an example software/firmware/instructions distribution platform (e.g., one or more servers) to distribute software, instructions, and/or firmware (e.g., corresponding to the example machine-readable instructions of FIGS. 3A, 3B, and 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 605 to distribute software such as the example machine-readable instructions 532 of FIG. 5 to other hardware devices (e.g., hardware devices owned and/or operated by third parties from the owner and/or operator of the software distribution platform) is illustrated in FIG. 6. The example software distribution platform 605 may be implemented by any computer server, data facility, cloud service, etc., capable of storing and transmitting software to other computing devices. The third parties may be customers of the entity owning and/or operating the software distribution platform 605. In the illustrated example, the software distribution platform 605 includes one or more servers and one or more storage devices. The storage devices store the machine-readable instructions 532, which may correspond to the example machine-readable instructions of FIGS. 3A, 3B, and 4, as described above. The one or more servers of the example software distribution platform 605 are in communication with an example network 610, which may correspond to any one or more of the Internet and/or any of the example networks described above. The servers enable downloading the machine-readable instructions 532 from the software distribution platform 605. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

As used herein "substantially real-time" refers to occurrence in a near instantaneous manner recognizing there may be real world delays for computing time, transmission, etc. Thus, unless otherwise specified, "substantially real-time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include any circuitry that can be programmed or configured to perform different operations and that includes one or more semiconductor-based logic devices (e.g., electrical hardware implemented by one or more transistors. Programmable circuitry may be: (i) one or more special purpose electrical circuits (e.g., an ASIC) and/or (ii) one or more general purpose semiconductor-based electrical circuits programmable with instructions. Examples of programmable circuitry include programmable microprocessors such as CPUs, FPGAs, GPUs, DSPs, XPUs, Network Processing Units (NPUs), and/or integrated circuits such as ASICs. For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface (s) (API(s)) that may assign computing tasks to whichever one(s) of the multiple types of programmable circuitry is/are suited and available to perform the computing tasks.

From the foregoing, it will be appreciated that example systems, apparatus, articles of manufacture, and methods have been disclosed that monitor advertising on media access clients. Disclosed systems, apparatus, articles of manufacture, and methods improve a network-based media delivery system by monitoring advertisements presented in media and implementing a network-based feedback tool to generate alerts/notifications about ad-selection and/or ad-presentation issues. Disclosed systems, apparatus, articles of manufacture, and methods are accordingly directed to one or more improvement(s) in the operation of a machine such as a computer or other electronic.

Example methods, apparatus, systems, and articles of manufacture to methods and apparatus to monitor advertising on media access clients are disclosed herein. Further examples and combinations thereof include the following:

Example 1 includes an apparatus comprising memory, machine-readable instructions in the memory, and programmable circuitry to be programmed by the machine-readable instructions to at least access a media asset identifier in a first command from a remote service, generate a second command based on a media access client type identified in the first command, the second command to include the media asset identifier, cause transmission of the second command to a media access client of the media access client type, access a media asset log generated by the media access client, the media asset log based on the media access client accessing media corresponding to the media asset identifier, and after performing a verification process on the media asset log, causing transmission of the media asset log to the remote service.

Example 2 includes the apparatus of example 1, wherein the programmable circuitry is to perform the verification process on the media asset log by determining whether an advertisement identifier is present in the media asset log.

Example 3 includes the apparatus of one or both of example 1 and/or example 2, wherein the programmable circuitry is to perform the verification process on the media asset log by determining that a device advertising identifier corresponding to the media access client is present in the media asset log.

Example 4 includes the apparatus of any one or more of examples 1-3, wherein the programmable circuitry is to parse the media asset log after receiving a media access confirmation from the media access client, the media access confirmation based on the media asset identifier.

Example 5 includes the apparatus of any one or more of examples 1-4, wherein the media asset log is a first media asset log and the media access client is a first media access client, the programmable circuitry to parse the first media asset log based on a determination that the first media asset log corresponds to a client-side advertisement insertion type, the programmable circuitry to access a second media asset log from a second media access client, and based on a determination that the second media asset log corresponds to a server-side advertisement insertion type, cause transmission of the second media asset log to the remote service without parsing the second media asset log before the transmission of the second media asset log.

Example 6 includes the apparatus of any one or more of examples 1-5, wherein the first media access client is a computer, the second media access client is an over-the-top device.

Example 7 includes the apparatus of any one or more of examples 1-6, wherein the programmable circuitry is to parse the first media asset log by converting the first media asset log to a human-readable format.

Example 8 includes a non-transitory machine-readable storage medium comprising instructions to cause programmable circuitry at an intermediate client device to at least access a first media asset log and a second media asset log, the intermediate client device to communicate with a plurality of media access clients and to communicate with a remote service, parse the first media asset log based on a determination that the first media asset log corresponds to a client-side advertisement insertion type, and cause transmission of the second media asset log to the remote service without parsing the second media asset log at the intermediate client device based on a determination that the second media asset log corresponds to a server-side advertisement insertion type.

Example 9 includes the non-transitory machine-readable storage medium of example 8, wherein the first media asset log corresponds to a first one of the media access clients that presents first advertisements based on the client-side advertisement insertion type, and the second media asset log corresponds to a second one of the media access clients that presents second advertisements based on the server-side advertisement insertion type.

Example 10 includes the non-transitory machine-readable storage medium of one or both of example 8 and/or example 9, wherein the first one of the media access clients is an over-the-top device, the second one of the media access clients is a mobile device.

Example 11 includes the non-transitory machine-readable storage medium of any one or more of examples 8-10, wherein the programmable circuitry is to parse the first media asset log by converting the first media asset log to a human-readable format.

Example 12 includes the non-transitory machine-readable storage medium of any one or more of examples 8-11, wherein the programmable circuitry is to access a media asset identifier in a first command from the remote service, cause transmission of a second command to a first one of the media access clients, the second command to include the media asset identifier, and access the first media asset log generated by the first one of the media access clients, the first media asset log based on the first one of the media access clients accessing a media asset corresponding to the media asset identifier.

Example 13 includes the non-transitory machine-readable storage medium of any one or more of examples 8-12, wherein the first media asset log is from a first one of the media access clients, the programmable circuitry to access the first media asset log after accessing a media access confirmation from the first one of the media access clients.

Example 14 includes the non-transitory machine-readable storage medium of any one or more of examples 8-13, wherein the programmable circuitry is to parse the first media asset log after a determination that the first media asset log includes a logged ad break corresponding to a media asset.

Example 15 includes a method comprising receiving a first media asset log at an intermediate client device, the intermediate client device in communication with a plurality of media access clients and in communication with a remote service, receiving a second media asset log at the intermediate client device, determining, by programmable circuitry programmed by at least one instruction, whether the first media asset log corresponds to a server-side advertisement insertion type or a client-side advertisement insertion type, determining, by the programmable circuitry, whether the second media asset log corresponds to the server-side advertisement insertion type or the client-side advertisement insertion type, parsing, by the programmable circuitry, the first media asset log at the intermediate client device based on a determination that the first media asset log corresponds to the client-side advertisement insertion type, and causing, by the programmable circuitry, transmission of the second media asset log to the remote service without parsing the second media asset log at the intermediate client device based on a determination that the second media asset log corresponds to the server-side advertisement insertion type.

Example 16 includes the method of example 15, wherein the first media asset log corresponds to a first one of the media access clients that presents first advertisements based on the client-side advertisement insertion type, and the second media asset log corresponds to a second one of the media access clients that presents second advertisements based on the server-side advertisement insertion type.

Example 17 includes the method of one or both of example 15 and/or example 16, wherein the parsing of the first media asset log at the intermediate client device includes converting the first media asset log to a human-readable format.

Example 18 includes the method of any one or more of examples 15-17, including accessing a media title in a first command from the remote service, sending a second command to a first one of the media access clients, the second command to include the media title, and accessing the first media asset log generated by the first one of the media access clients, the first media asset log based on the first one of the media access clients accessing media corresponding to the media title.

Example 19 includes the method of any one or more of examples 15-18, wherein the receiving of the first media asset log is from a first one of the media access clients after receiving a media access confirmation from the first one of the media access clients.

Example 20 includes the method of any one or more of examples 15-19, wherein the parsing of the first media asset log is in response to a determination that the first media asset log includes a logged ad break corresponding to a media asset.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

memory;

machine-readable instructions in the memory; and programmable circuitry to be programmed by the machine-readable instructions to at least:

access a media asset identifier in a first command from a remote service;

generate a second command based on a media access client type identified in the first command, the second command to include the media asset identifier;

cause transmission of the second command to a first media access client of the media access client type;

access a first media asset log generated by the first media access client, the first media asset log based on the first media access client accessing media corresponding to the media asset identifier;

parse the first media asset log based on a determination that the first media asset log corresponds to a client-side advertisement insertion type;

after performing a verification process on the first media asset log, causing transmission of the first media asset log to the remote service;

access a second media asset log from a second media access client; and based on a determination that the second media asset log corresponds to a server-side advertisement insertion type, cause transmission of the second media asset log to the remote service without parsing the second media asset log before the transmission of the second media asset log.

2. The apparatus of claim 1, wherein the programmable circuitry is to perform the verification process on the first media asset log by determining whether an advertisement identifier is present in the first media asset log.

3. The apparatus of claim 1, wherein the programmable circuitry is to perform the verification process on the first media asset log by determining that a device advertising identifier corresponding to the first media access client is present in the first media asset log.

4. The apparatus of claim 1, wherein the programmable circuitry is to parse the first media asset log after receiving a media access confirmation from the first media access client, the media access confirmation based on the media asset identifier.

5. The apparatus of claim 1, wherein the first media access client is a computer, the second media access client is an over-the-top device.

6. The apparatus of claim 1, wherein the programmable circuitry is to parse the first media asset log by converting the first media asset log to a human-readable format.

7. A non-transitory machine-readable storage medium comprising instructions to cause programmable circuitry at an intermediate client device to at least:

access a first media asset log and a second media asset log, the intermediate client device to communicate with a plurality of media access clients and to communicate with a remote service;

parse the first media asset log based on a determination that the first media asset log corresponds to a client-side advertisement insertion type; and cause transmission of the second media asset log to the remote service without parsing the second media asset log at the intermediate client device based on a determination that the second media asset log corresponds to a server-side advertisement insertion type.

8. The non-transitory machine-readable storage medium of claim 7, wherein the first media asset log corresponds to a first one of the media access clients that presents first advertisements based on the client-side advertisement insertion type, and the second media asset log corresponds to a second one of the media access clients that presents second advertisements based on the server-side advertisement insertion type.

9. The non-transitory machine-readable storage medium of claim 8, wherein the first one of the media access clients is an over-the-top device, the second one of the media access clients is a mobile device.

10. The non-transitory machine-readable storage medium of claim 7, wherein the programmable circuitry is to parse the first media asset log by converting the first media asset log to a human-readable format.

11. The non-transitory machine-readable storage medium of claim 7, wherein the programmable circuitry is to:

access a media asset identifier in a first command from the remote service;

cause transmission of a second command to a first one of the media access clients, the second command to include the media asset identifier; and access the first media asset log generated by the first one of the media access clients, the first media asset log based on the first one of the media access clients accessing a media asset corresponding to the media asset identifier.

12. The non-transitory machine-readable storage medium of claim 7, wherein the first media asset log is from a first one of the media access clients, the programmable circuitry to access the first media asset log after accessing a media access confirmation from the first one of the media access clients.

13. The non-transitory machine-readable storage medium of claim 7, wherein the programmable circuitry is to parse the first media asset log after a determination that the first media asset log includes a logged ad break corresponding to a media asset.

14. A method comprising:

receiving a first media asset log at an intermediate client device, the intermediate client device in communication with a plurality of media access clients and in communication with a remote service;

receiving a second media asset log at the intermediate client device;

determining, by programmable circuitry programmed by at least one instruction, whether the first media asset log corresponds to a server-side advertisement insertion type or a client-side advertisement insertion type;

determining, by the programmable circuitry, whether the second media asset log corresponds to the server-side advertisement insertion type or the client-side advertisement insertion type;

parsing, by the programmable circuitry, the first media asset log at the intermediate client device based on a determination that the first media asset log corresponds to the client-side advertisement insertion type; and causing, by the programmable circuitry, transmission of the second media asset log to the remote service without parsing the second media asset log at the intermediate client device based on a determination that the second media asset log corresponds to the server-side advertisement insertion type.

15. The method of claim 14, wherein the first media asset log corresponds to a first one of the media access clients that presents first advertisements based on the client-side advertisement insertion type, and the second media asset log corresponds to a second one of the media access clients that presents second advertisements based on the server-side advertisement insertion type.

16. The method of claim 14, wherein the parsing of the first media asset log at the intermediate client device includes converting the first media asset log to a human-readable format.

17. The method of claim 14, including:

accessing a media title in a first command from the remote service;

sending a second command to a first one of the media access clients, the second command to include the media title; and accessing the first media asset log generated by the first one of the media access clients, the first media asset log based on the first one of the media access clients accessing media corresponding to the media title.

18. The method of claim 14, wherein the receiving of the first media asset log is from a first one of the media access clients after receiving a media access confirmation from the first one of the media access clients.

19. The method of claim 14, wherein the parsing of the first media asset log is in response to a determination that the first media asset log includes a logged ad break corresponding to a media asset.

* * * * *